United States Patent
Davidson et al.

(10) Patent No.: US 6,879,627 B1
(45) Date of Patent: Apr. 12, 2005

(54) VARIABLE RATE CONTINUOUS MODE SATELLITE MODEM

(75) Inventors: Jeffrey Davidson, Kochav Yair (IL); Alexander Pokrass, Bat Yam (IL); Sorin Goldenberg, Petach Tikva (IL); Israel Shahaf Wayer, Tel Aviv (IL)

(73) Assignee: Shiron Satellite Communications (1996) Ltd., Petach Tikva (IL)

( * ) Notice: Subject to any disclaimer, the term of this patent is extended or adjusted under 35 U.S.C. 154(b) by 769 days.

(21) Appl. No.: 09/584,746

(22) Filed: Jun. 1, 2000

(51) Int. Cl.[7] .............................. H04B 1/38; H04L 5/16

(52) U.S. Cl. ...................................................... 375/222

(58) Field of Search ................................ 375/222, 295, 375/219, 344, 152, 142; 342/357.09; 370/337

(56) References Cited

U.S. PATENT DOCUMENTS

| | | | | |
|---|---|---|---|---|
| 4,485,383 A | * | 11/1984 | Maher ........................ | 342/352 |
| 5,276,633 A | * | 1/1994 | Fox et al. .................... | 708/276 |
| 5,410,368 A | * | 4/1995 | Krishnamurthy et al. ... | 348/726 |
| 5,504,785 A | * | 4/1996 | Becker et al. ............... | 375/344 |
| 5,742,639 A | * | 4/1998 | Fasulo et al. ................ | 375/219 |
| 5,799,010 A | * | 8/1998 | Lomp et al. ................. | 370/335 |
| 5,812,545 A | * | 9/1998 | Liebowitz et al. ........... | 370/337 |
| 5,872,810 A | * | 2/1999 | Philips et al. ............... | 375/222 |
| 5,999,561 A | * | 12/1999 | Naden et al. ................ | 375/142 |

OTHER PUBLICATIONS

Digital filter and square timing recovery Oerder, M.; Meyr, H.; Communications, IEEE Transactions on , vol.: 36 , Issue: 5 , May 1988 pp.: 605–612.*

* cited by examiner

Primary Examiner—Stephen Chin
Assistant Examiner—Harry Vartanian
(74) Attorney, Agent, or Firm—G.E. Ehrlich (1995) Ltd.

(57) ABSTRACT

A satellite modem whose baseband modules can be implemented mostly in software running on a suitable processor such as a high speed digital signal processor (DSP). The modem includes a RF portion and a baseband portion. The digitized output of a matched filter is input to the baseband processing portion that consists of software executing on a DSP. The modem comprises an antenna coupled to an upconverter/downconverter. The upconverter/downconverter is coupled to a RF transceiver which functions to receive a transmit signal from a baseband transmitter module and generate a signal for input to the upconverter/downconverter. The RF transceiver also functions to receive a downconverted signal and output an IF signal for input to an IF module. The IF functions to generate I and Q outputs that are input to a digital baseband module. The baseband module can be implemented as software executing on a DSP. Also included in a technique of modulation wipe off wherein the effects of modulation are removed. A signal detection technique performs signal detection and frequency acquisition in the presence of multiple signals in accordance with a method described hereinbelow. A timing acquisition technique includes an unwrapping technique that functions to correct timing errors before averaging is performed. Linear changes to the time estimates are performed using LSR techniques.

3 Claims, 15 Drawing Sheets

VARIABLE RATE CONTINUOUS MODE SATELLITE MODEM

FIELD OF THE INVENTION

The present invention relates generally to communications and more particularly relates to a variable rate continuous mode modem suitable for satellite communications.

BACKGROUND OF THE INVENTION

Recently there has been a widespread proliferation of satellite communications systems throughout the world. A large number of consumers have acquired satellite communications equipment for home reception of satellite broadcast television signals in addition to many businesses having acquired such equipment for the purpose of receiving and/or transmitting useful business information.

Typically, satellite communications systems have been constructed using a combination of RF circuitry, IF and baseband circuitry. A common trend in the art is to implement the IF and baseband modules using one or more FPGAs and/or ASICs. A disadvantage of this is that it is difficult or even impossible to perform some techniques that are only possible to perform in software. Attempting to perform these techniques in circuitry, if possible, would result in large, complex and expensive silicon.

Thus it is desirable to have a satellite modem wherein the receiver portion is mainly implemented in software so as to reduce cost, making necessary changes much simpler to perform and potentially reducing the size of the receiver.

SUMMARY OF THE INVENTION

The present invention overcomes the disadvantages of the prior art by providing a satellite modem whose baseband modules can be implemented mostly in software running on a suitable processor such as a high speed digital signal processor (DSP) which are commonly available today. The modem includes a RF portion and a baseband portion. The digitized output of a matched filter is input to the baseband processing portion that consists of software executing on a DSP.

The modem comprises an antenna coupled to an upconverter/downconverter. The upconverter/downconverter is coupled to a RF transceiver which functions to receive a transmit signal from a baseband transmitter module and generate a signal for input to the upconverter/downconverter. The RF transceiver also functions to receive a downconverted signal and output an IF signal for input to an IF module. The IF functions to generate I and Q outputs that are input to a digital baseband module. The baseband module can be implemented as software executing on a DSP.

A novel aspect of the present invention is the method of performing phase acquisition. In particular, the invention disclosed a technique of modulation wipe off wherein the effects of modulation are removed. The technique involves rotating all the symbol vectors into a single quadrant. This is done in order to avoid the case where the constellation points are spread over more than one quadrant due to excessive noise being present in the channel.

Another novel aspect of the invention is the signal detection technique. The signal detection technique performs signal detection and frequency acquisition in the presence of multiple signals in accordance with a method described hereinbelow.

Still another novel aspect of the present invention is the timing acquisition technique that includes an unwrapping technique. This functions to correct timing errors before averaging is performed. In addition, linear changes to the time estimates are performed using LSR techniques.

The satellite modem of the present invention, wherein the baseband receiver and transmitter are mainly implemented in software, provides for a reduction in cost, makes performing necessary changes much simpler and reduces the size of the modem. In addition, the invention represents a significant step toward the goal of a complete software radio.

There is thus provided in accordance with the present invention a satellite modem, comprising a housing, a antenna for receiving and transmitting radio frequency (RF) signals, an upconverter/downconverter coupled to the antenna and adapted to upconvert RF signals from a first frequency band to a second frequency band, and adapted to downconvert RF signals from the second frequency band to the first frequency band, an RF transceiver coupled to the upconverter/downconverter and adapted to receive an output transmit signal and to generate an output RF signal therefrom, the RF transceiver adapted to receive an input RF signal from the upconverter/downconverter and generate an input receive signal therefrom, an intermediate frequency (IF) module adapted to receive the input receive signal and generate I and Q signals in response thereto, a baseband module adapted to receive the I and Q signals and to generate receive data in accordance therewith and a baseband module adapted to generate the output transmit signal in accordance with a transmit data signal input thereto.

There is also provided in accordance with the present invention a receiver baseband apparatus, comprising input means adapted to receive an I and Q signal, an I matched filter adapted to receive the I signal and generate an I filtered output therefrom, a Q matched filter adapted to receive the Q signal and generate a Q filtered output therefrom, a processor programmed to perform automatic gain control (AGC) and generate an AG control signal therefrom, perform timing detection and generate an A/D clock control signal therefrom, perform phase detection and generate a voltage controlled oscillator (VCO) control signal therefrom, a decoder adapted to receive the I output signal and the Q output signal from the processor and to generate a decoded output therefrom, a deinterleaver adapted to generate a deinterleaved output in accordance with the decoded output signal input thereto, a forward error correction decoder adapted to generate output receive data in accordance with the deinterleaved output signal input thereto and a controller adapted to manage and control the input means, I matched filter, Q matched filter, the processor, the decoder, the deinterleaver and the forward error correction decoder.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AGC | Automatic Gain Control |
| ASIC | Application Specific Integrate Circuit |
| BER | Bit Error Rate |
| DDS | Direct Digital Synthesizer |
| DEC | Circular Drift Function of EC |
| DFT | Discrete Frequency Transform |
| DSP | Digital Signal Processor |
| ES | Estimated Spectrum |
| FE | Frequency Estimate |
| FFT | Fast Fourrier Transform |
| FIR | Finite Impulse Response |
| FPGA | Field Programmable Gate Array |
| IF | Intermediate Frequency |
| IIR | Infinite Impulse Response |
| LIM | Limit of Uncertainty Range |
| LPF | Low Pass Filter |
| LSR | Least Squares Regression |
| NCO | Numerically Controlled Oscillator |
| NFFT | Number of FFT points |
| PI | Peak Indexes |
| PLL | Phase Lock Loop |
| QPSK | Quadrature Phase Shift Keying |
| RF | Radio Frequency |
| RMS | Root Mean Square |

-continued

| Term | Definition |
| --- | --- |
| SNR | Signal to Noise Ratio |
| TS | Theoretic Spectrum Mask |
| VCO | Voltage Controlled Oscillator |

General Description

The present invention is a variable rate continuous mode satellite modem capable of transmitting and receiving at a symbol rate in the range of 9.6 K to 256 K symbols/sec. Note that the bit rate depends on the coding rate. For example, at a code rate of ½, with QPSK, the bit rate is equal to the symbol rate. At a code rate of ¾, with QPSK, the bit rate is 50% more than the symbol rate. To aid in understanding the principles of the present invention, the description of the processing performed in the modem is divided into five main portions: (1) the main loop including a state machine for defining acquisition, tracking, etc., (2) signal detection and initial frequency estimation, (3) acquisition of timing, frequency and phase, (4) pre-tracking (AGC, timing and phase tracking) with a phase loop having a larger bandwidth and phase ambiguity to be solved and (5) tracking of the AGC, timing and phase. Additional processing includes the soft decision data detection.

Figure 1:
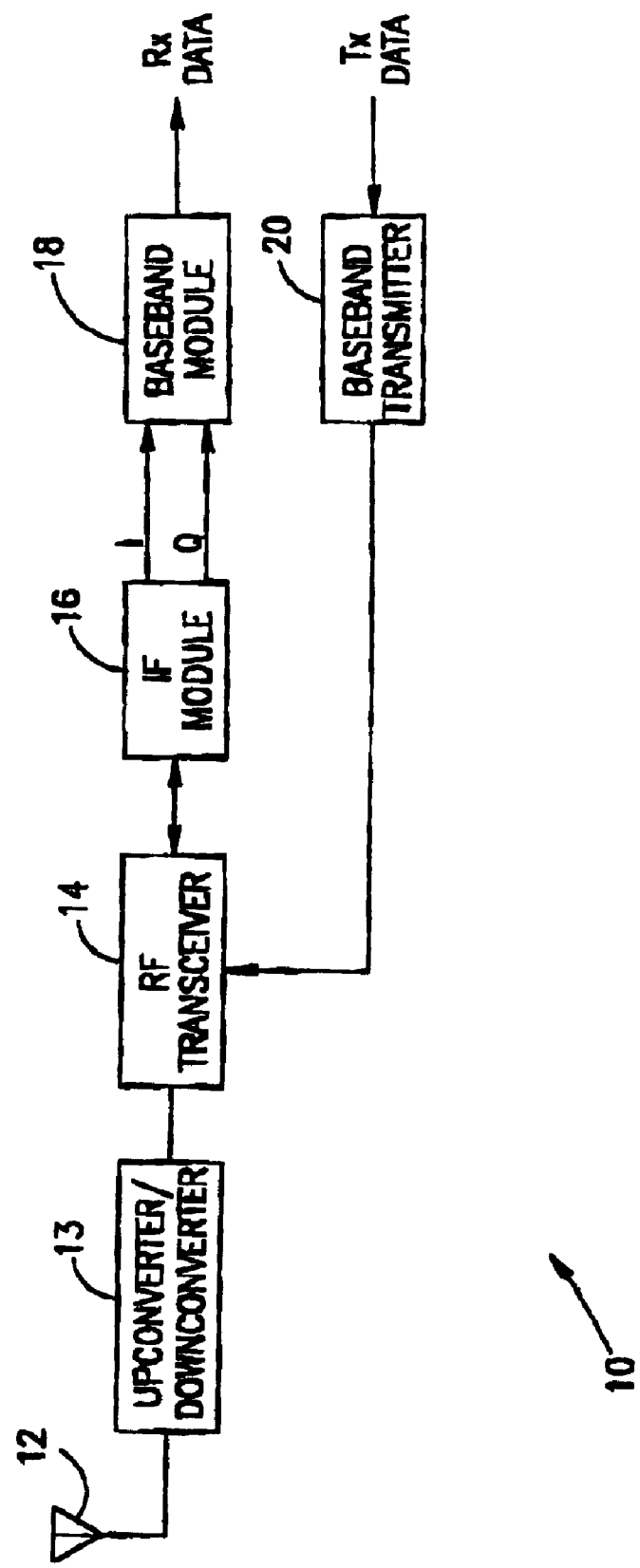
FIG. 1 is a block diagram illustrating the RF, IF and baseband portions of the variable rate satellite modem of the present invention.

The main loop will now be described in more detail. A block diagram illustrating the RF, IF and baseband portions of the variable rate satellite modem of the present invention is shown in FIG. 1. The modem, generally referenced 10, comprises a housing (not shown), an upconverter/downconverter 13 coupled to an external antenna 12 and a RF transceiver 14 coupled to the upconverter/downconverter 13. The upconverter functions to convert the output of the RF transceiver 14, e.g., L band, to the RF output frequency, e.g., C or Ku band. The downconverter performs downconversion of the signal received over the antenna from RF frequencies, e.g., C or Ku band, to L band for input to the RF transceiver 14. The RF transceiver downconverts the received RF signal to an IF signal. The IF signal output of the RF transceiver 14 is input to the IF module 16 which functions to generate the I and Q baseband signals. The baseband module 18 demodulates the I and Q signals to yield the receive Rx data. The baseband module 18 performs signal processing tasks on the I and Q data from the IF module 16 such as Viterbi decoding, de-interleaving and Reed Solomon decoding.

In the transmit direction, the baseband transmitter 20 generates a baseband transmit signal in response to the input transmit Tx data. The baseband transit signal is input to the RF transceiver 14 which upconverts the signal to an RF frequency signal which is then input to the external antenna 12.

Baseband Module

Figure 2:
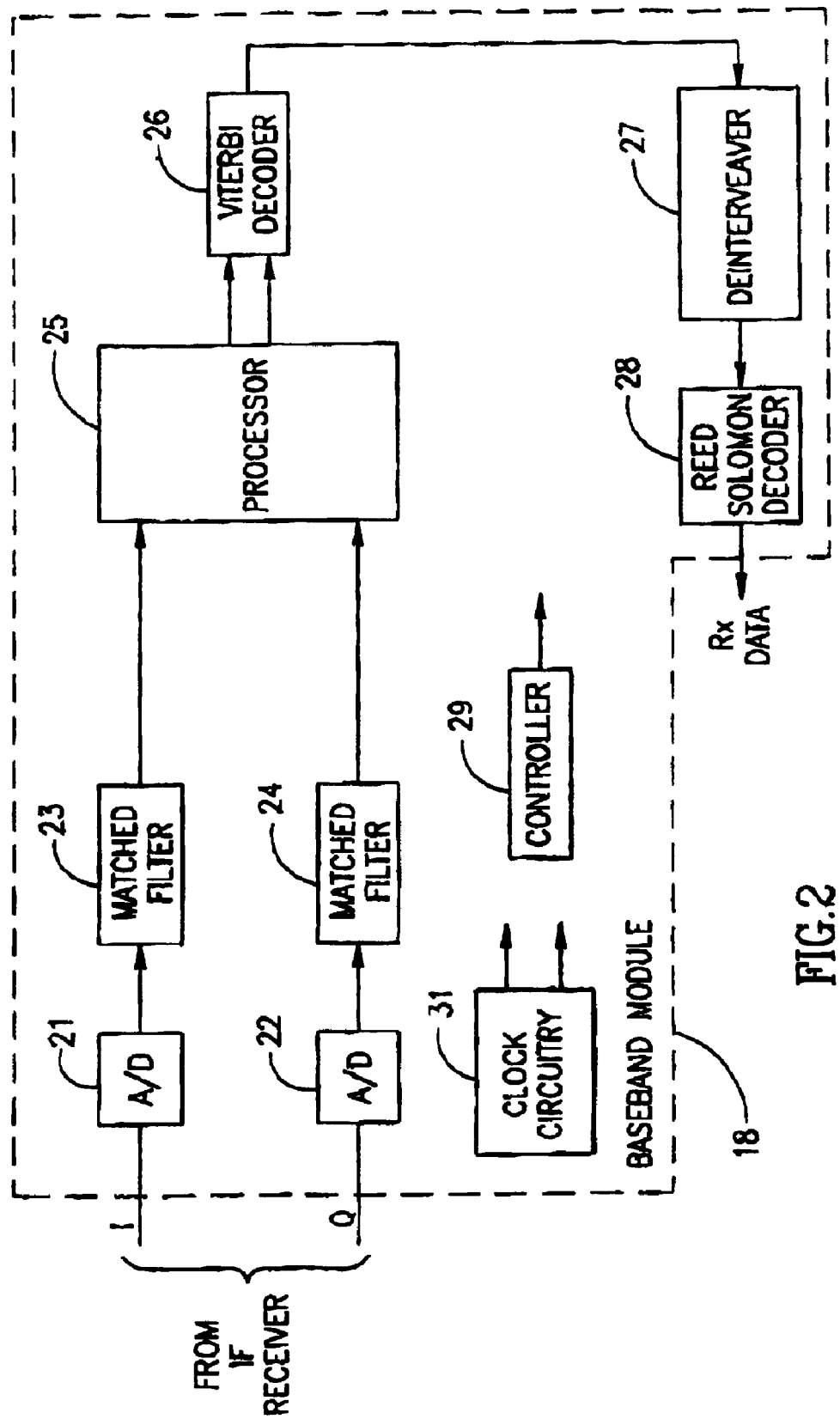
FIG. 2 is a block diagram illustrating the baseband module portion of the variable rate satellite modem in more detail.

A block diagram illustrating the baseband module portion of the variable rate satellite modem in more detail is shown in FIG. 2. The baseband module 18 receives the baseband I and Q signals. The analog I signal is converted to digital by A/D converter 21. The 8-bit digitized I signal is input to a matched filter 23. The analog Q signal is converted to digital by A/D converter 22. The 8-bit digitized Q signal is input to a matched filter 24. The matched filters 23, 24 are implemented in hardware but may alternatively be implemented in software. The I and Q outputs of the matched filters 23, 24 are input to processor 25.

In one embodiment of the invention, for example, the RF receive frequency for C band operation is approximately 4 GHz and the RF transmit frequency is approximately 6 GHz. The RF transceiver 14 downconverts/upconverts to/from an IF frequency of approximately 900 MHz. The IF module 16 downconverts the IF signal to analog I and Q baseband signals within the bandwidth range of approximately 0 to 170 KHz. The baseband module 18 demodulates the baseband I and Q signal to a soft decision digital data signal. Note that the IF frequency, between the RF transceiver 14 and the IF module 16, may be 70 MHz ±18 MHz or 140 MHz ±36 MHz. The RF transceiver 14 may comprise a commercially available transceiver suitable for operation with the satellite modem of the present invention. For Ku band operation, the RF receive frequency is approximately 12 GHz and the RF transmit frequency is approximately 14 GHz. The RF transceiver downconverts/upconverts to/from an IF frequency within the range of approximately 950 to 1450 MHz.

In an alternative embodiment, the signal from the RF transceiver constitutes a first IF which is input to a modified IF module that outputs a second IF signal. This second IF signal is converted to digital via an A/D converter and input to a digital converter that functions to generate I and Q signals.

The processor 25 performs the majority of the signal processing functions in the modem 10 such as activity detection, timing acquisition, frequency acquisition, phase acquisition and tracking. The processor 25 functions to output 3-bit I and Q signals that are input to a Viterbi decoder 26. The output of the Viterbi decoder 26 is input to a deinterleaver 27. The output of the deinterleaver 27 is input to a Reed Solomon decoder 28 which functions to output the receive Rx data.

A controller 29 controls and manages the operation of the baseband module and clock circuitry 31 functions to provide the various clocks needed by the elements of the baseband module 18.

Main Processing Loop

Figure 3:
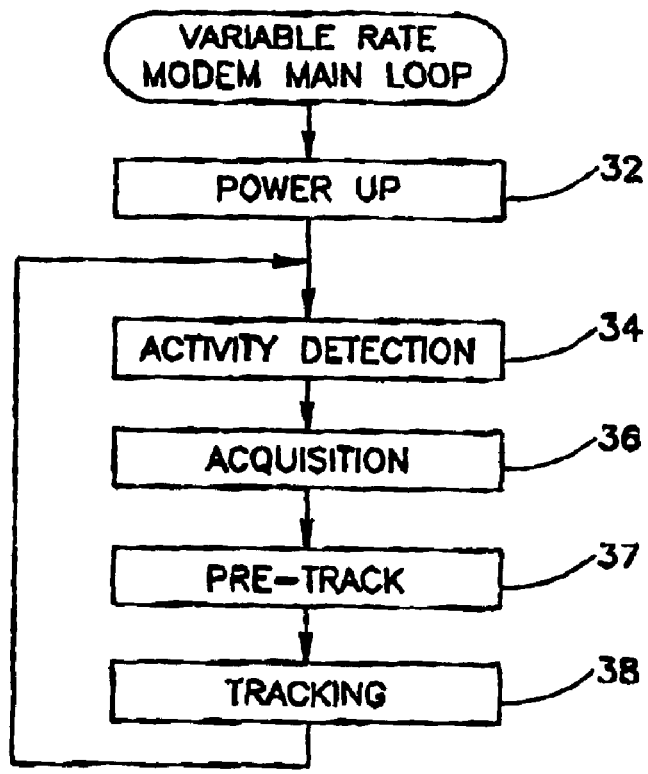
FIG. 3 is a flow diagram illustrating the main software processing loop of the variable rate modem.

A flow diagram illustrating the main software processing loop of the variable rate modem is shown in FIG. 3. Upon power up (step 32) a series of start up tasks are performed. These include activity detection (step 34), acquisition (step 36) and pre-tracking (step 37). The activity detection (step 34) performs signal detection, AGC and coarse frequency acquisition. In this step, the modem is listening for a signal from the transmitter. The frequency/tuning offset is reduced to a suitable level such that when the PLL is started, the errors are relatively small and the PLL is capable of locking onto the signal. During the activity detect phase, no matched filtering is performed. In addition, the frequency is variable with an approximately frequency offset of 30 KHz at a low rate and with a bandwidth of approximately 7 to 8 KHz.

During acquisition (step 36), AGC is performed as well as timing, fine frequency and phase acquisition. Next, during the pre-tracking phase (step 37), phase tracking acquisition is performed wherein a phase estimate is performed every four symbols.

Once the start up phase is completed, tracking is performed (step 38). This step includes AGC, timing and phase tracking. The above steps are repeated when tracking is lost on the signal or after each time the modem is powered up.

Activity Detection

Figure 4:
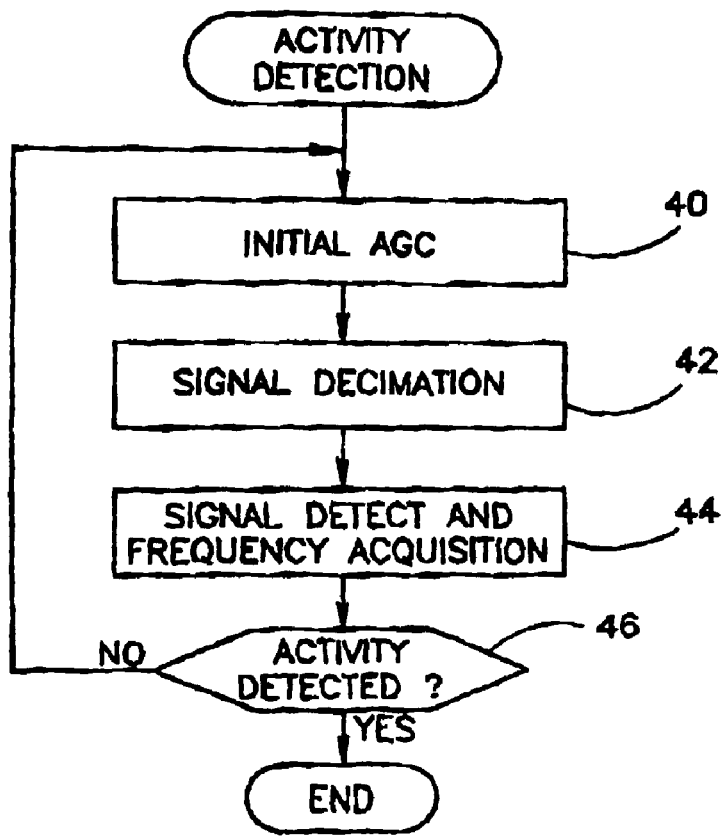
FIG. 4 is a flow diagram illustrating the processing performed upon power up or after the communication link is broken.

Each of the above steps is described in more detail hereinbelow beginning with the activity detection phase. A flow diagram illustrating the activity detect method (step 34 FIG. 3) is shown in FIG. 4. The following steps are performed upon power up or after a catastrophic event whereby the communication link is completely broken. The initial automatic gain control (AGC) step includes measuring the energy at the output of the A/D converters 21,22 (FIG. 2), i.e., at the input buffer (step 40).

Next, the decimation of the input signal is performed (step 42). Decimation by a factor of 1, 2, 4 or 8 is performed. Signal detection and initial coarse frequency acquisition and estimation is performed (step 44). If signal activity is not detected, the method loops back and repeats steps 40, 42, 44 until a signal is detected (step 46).

Figure 5:
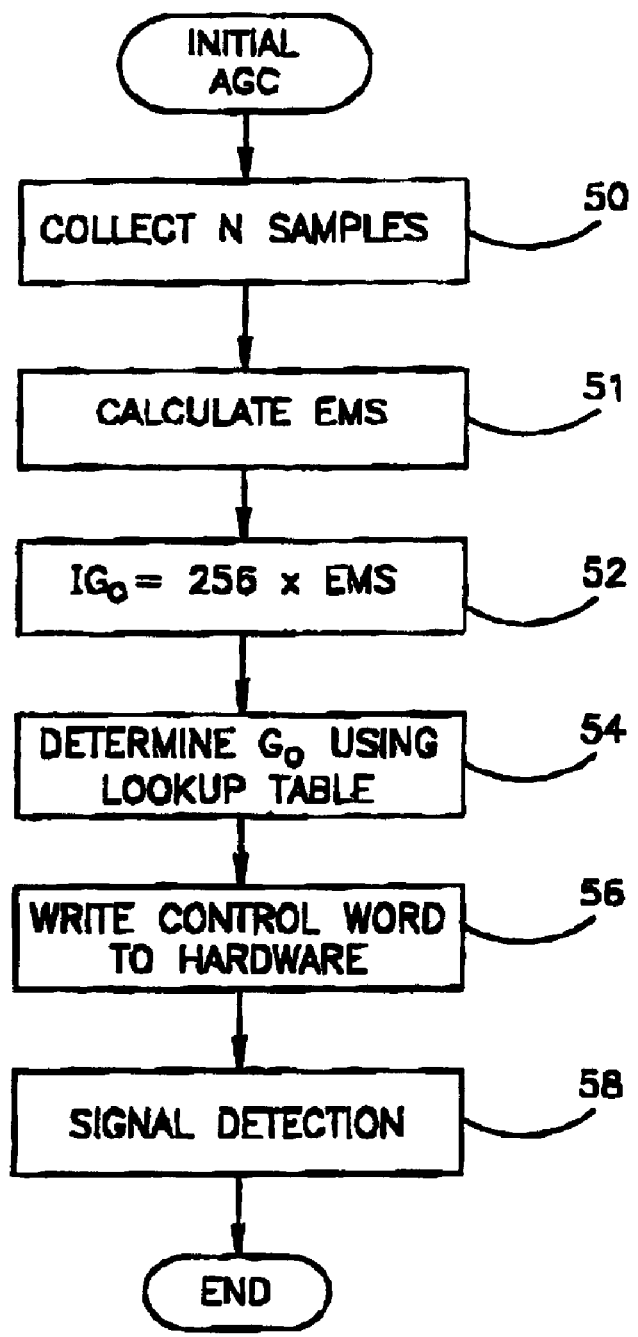
FIG. 5 is a flow diagram illustrating the initial automatic gain control processing portion of the variable rate modem.

Each of the steps of the activity detection method will now be described in more detail beginning with the initial AGC step 40. A flow diagram illustrating the initial automatic gain control (AGC) processing portion of the variable rate modem is shown in FIG. 5. First, N samples of the input signal are collected whereby N may be 64, 128 or 256 (step 50). The unfiltered samples are expressed as $$z_n = I_n + jQ_n \tag{1}$$

The mean square energy $E_{ms}$ is then calculated using the following equation (step 51).

$$E_{ms} = \frac{1}{N} \sum_{i=1}^{N} |z_i|^2 \tag{2}$$

where $G_o$ is the gain of the AGC and $IG_o$ is the inverse gain. The inverse gain $IG_o$ is set equal to $256*E_{ms}$ for scaling the RMS of the A/D converter input at $\frac{1}{16}$ maximum input voltage level (step 52). The value of $G_o$ is determined from a lookup table (step 54). The $G_o$ value is then written to the AGC hardware (step 56). Signal detection is then performed (step 58).

Signal decimation (step 42 FIG. 4) is performed before the actual processing in order to improve the frequency resolution at lower data rates. The resolution achieved is a particular fraction of the symbol rate. It is preferable to have between 4 and 10 samples per symbol, except for the case of very low data rates. This means that the signal is relatively wideband in the normalized frequency domain thereby enabling a reasonable resolution without requiring very long FFTs. The resolution can be expressed as $$\frac{\text{binwidth}}{\text{Symbol Rate}} = \frac{f_s/N}{R_b} \tag{3}$$

$$= \frac{f_s}{R_b} \cdot \frac{1}{N}$$

$$= \frac{nss}{N}$$

where $f_s$ is the sampling rate $R_b$ is the symbol rate nss is the number of samples per symbol N is the number of points in the FFT.

The parameters of the decimation for activity detection, also referred to as gear shifting, is presented below in Table 1.

TABLE 1

| Symbol Rate (KHz) | Sample Rate at A/D (KHz) | Max BW (KHz) | Decimation Factor | Number of samples per symbol | Normalized Cutoff Frequency | Relative Resolution (%) |
|---|---|---|---|---|---|---|
| 9.6–12 | 768 | 38.1 | 8 | 8–10 | 0.0496 | 3.1–3.9 |
| 12–16 | 864 | 41 | 8 | 6.75–9 | 0.0475 | 2.63–3.5 |
| 16–24 | 928 | 46.2 | 8 | 4.83–7.25 | 0.04978 | 1.88–2.8 |
| 24–32 | 512 | 51.6 | 4 | 4–5.33 | 0.1008 | 1.5–2 |
| 32–64 | 512–1024 | 51.6 | 4 | 4 | 0.1008 | 1.5 |
| 64–128 | 512–1024 | 73.2 | 2 | 4 | 0.1430 | 1.5 |
| 128–256 | 512–1024 | 116.4 | 1 | 4 | 0.2273 | 1.5 |

The maximum bandwidth is determined by the bandwidth of the higher rate plus a maximum frequency offset of 30 KHz.

The relative required resolution is determined from the limitations of the phase acquisition algorithm. The phase acquisition algorithm operates on blocks of eight symbols, trying four hypotheses for the axis, each rotated by 22.5 degrees from one another.

Therefore, over eight symbols, the maximum frequency offset causes less than 10 to 0.20% of 22.5 degrees, i.e., less than 2.5 to 5 degrees phase shift. This implies a resolution of much less than one degree per symbol. This corresponds to a resolution of less than 0.3% of the symbol period. This resolution, however, is very difficult to obtain, thus a fine frequency acquisition is performed prior to the phase acquisition. This yields resolutions between 1.5 to 3% of the symbol period.

The decimation is performed by filtering utilizing half band filters, which results in decimation by a factor of two. In addition, these filters are relatively inexpensive to implement since (1) approximately half the coefficients are zero, (2) the filter order is relatively low due to a wide transition band between the pass and stop band and (3) only every second output need be computed due to the decimation by two. The design of half band filters is described in more detail in "Multirate Systems and Filter Banks," P. P. Vaidyanathan, Prentice Hall 1993; "A Trick for the Design of FIR Half Band Filters," P. P. Vaidyanathan and T. Nguyen, IEEE Transactions on Circuits and Systems, Vol. CAS-34, pp. 378–389, April 1989, both of which are incorporated herein by reference.

In the embodiment presented herein, a filter having a length of 9 for the first stage is sufficient, while a filter length between 11 and 13 is sufficient for the second stage (or the single stage when decimation by 2 is performed).

The coefficients for the filters are presented below in Tables 2 through 4.

TABLE 2

Coefficients For Decimation By Factor Of 8 Using Three Filters

Filter #1

| -0.0336 | 0 | 0.2835 | 0.5000 | 0.2835 | 0 | -0.0336 |

Filter #2

| -0.0422 | 0 | 0.2902 | 0.5000 | 0.2902 | 0 | -0.0422 |

TABLE 2-continued

Coefficients For Decimation By Factor Of 8 Using Three Filters

Filter #3: Columns 1 through 7

| 0.0131 | 0 | -0.0236 | 0 | 0.0463 | 0 | -0.0949 |

Filter #3: Columns 8 through 14

| 0 | 0.3144 | 0.5000 | 0.3144 | 0 | -0.0949 | 0 |

Filter #3: Columns 15 through 19

| 0.0463 | 0 | -0.0236 | 0 | 0.0131 |

TABLE 3

Coefficients For Decimation By Factor Of 4 Using Two Filters

Filter #1

| -0.0426 | 0 | 0.2904 | 0.5000 | 0.2904 | 0 | -0.0426 |

Filter #2: Columns 1 through 7

| 0.0146 | 0 | -0.0246 | 0 | 0.0472 | 0 | -0.0956 |

Filter #2: Columns 8 through 14

| 0 | 0.3147 | 0.5000 | 0.3147 | 0 | -0.0956 | 0 |

Filter #2: Columns 15 through 19

| 0.0472 | 0 | -0.0246 | 0 | 0.0146 |

TABLE 4

Coefficients For Decimation By Factor Of 2 Using One Filter

Filter #3: Columns 1 through 7

| 0.0169 | 0 | -0.0691 | 0 | 0.3041 | 0.5000 | 0.3041 |

Filter #3: Columns 8 through 11

| 0 | -0.0691 | 0 | 0.0169 |

Signal Detection and Frequency Acquisition

This section describes the method used by the variable rate modem for signal detection and frequency acquisition in the presence of multiple signals in the spectrum. According to Intelsat standards two signals can be placed at frequencies that are a distance of 0.7*(symbol_rate$_1$+symbol_rate$_2$) as measured from center frequency to center frequency and whereby the $$\frac{E_b}{N_0}$$

levels differ by at most 7 dB.

Figure 6:
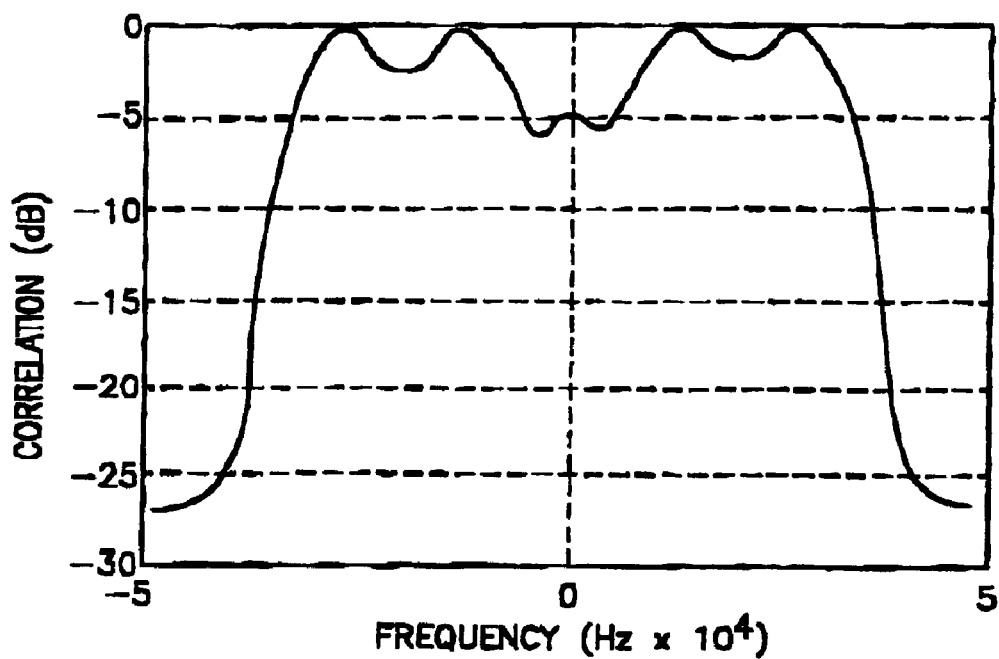
FIG. 6 is a chart illustrating the results of correlation between the spectral estimation and the spectral mask of the expected signal with both desired and adjacent signals having bit rates equal to 9600 bps.
Figure 7:
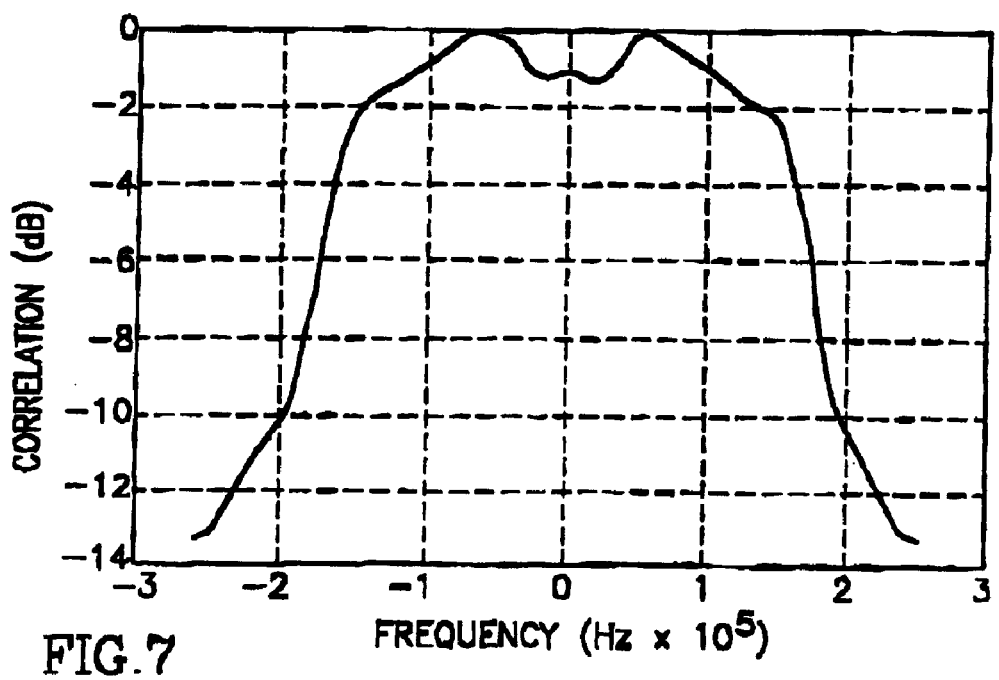
FIG. 7 is a chart illustrating the correlation result with the desired signal having a bit rate equal to 9600 bps and an interfering signal having a bit rate of 128 Kbps.

The methods of the present invention utilize FFT periodograms for spectral estimation followed by cyclic correlation with the spectral mask of the expected signal in order to detect the center of the signal. FIGS. 6 and 7 are charts illustrating the results of correlation between the spectral estimation and the spectral mask of the expected signal. The result of the correlation for the Intelsat scenario, for example, is shown in FIGS. 6 and 7. In both figures, the expected signal has a power level lower by 7 dB than adjacent signals and has a data rate of 9600 bps.

With reference to FIGS. 6 and 7, multiple peaks can be detected in the correlation. In contrast to the single signal scenario, the maximal peak is not the sole candidate for the central frequency of the expected signal. Preferably, peaks in the correlation should be examined to determine the potential locations of the desired signal.

Spectrum Estimation

Figure 8:
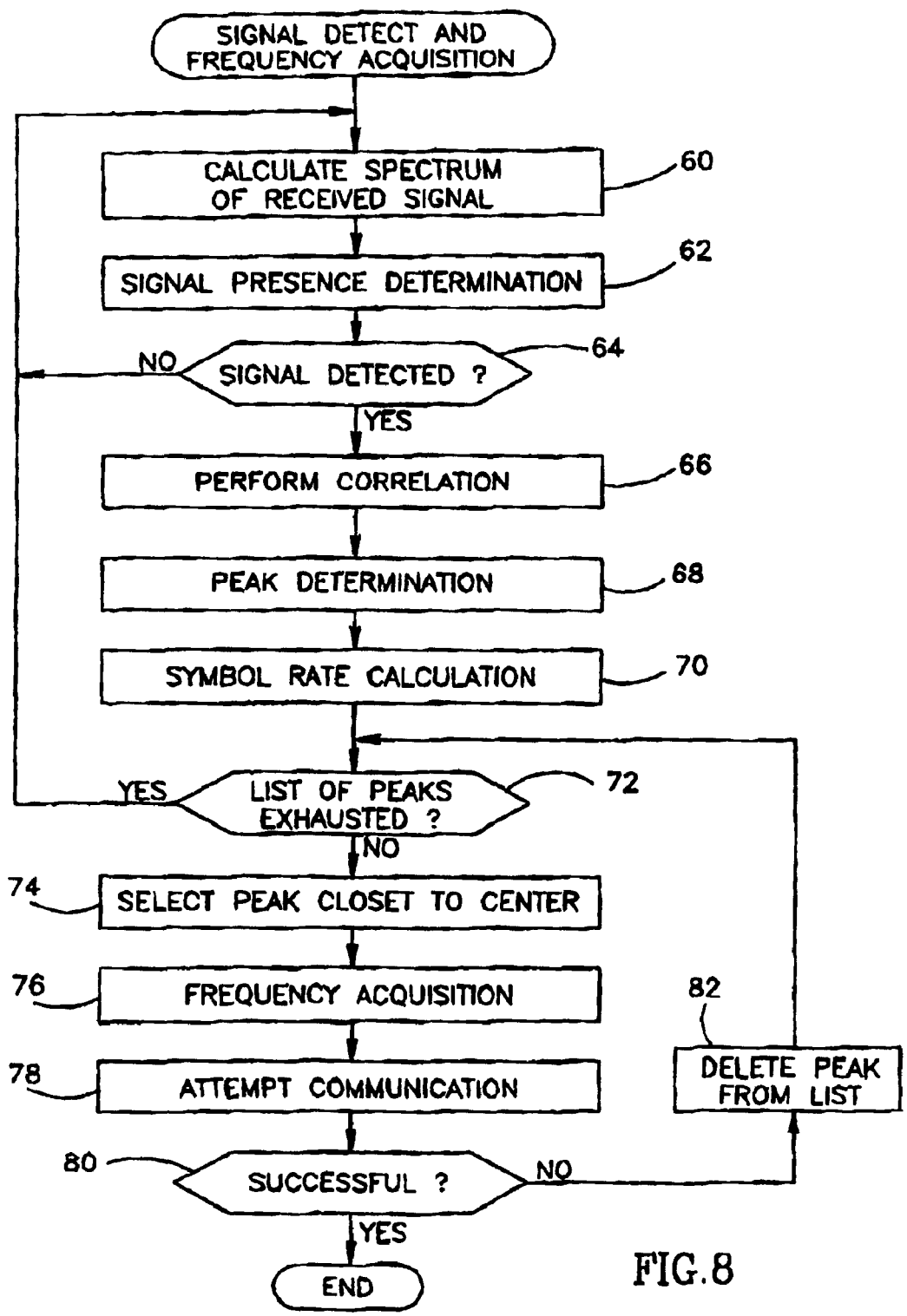
FIG. 8 is a flow diagram illustrating the signal detect and frequency acquisition processing portion performed upon power up.

A flow diagram illustrating the signal detect and frequency acquisition processing portion (step 44 FIG. 4) performed upon power up is shown in FIG. 8. The first step performed is to calculate the spectrum of the received signal (step 60). The estimated spectrum (ES) is represented as an array or size 256. The following pseudo code describes this step.

Spectral Estimation Pseudo Code 1. reset the ES array to zero;
2. for j=0 to num_reps−1(num_reps=32 for low $$\frac{E_b}{N_0}$$

levels and 16 for regular operation)
  get $\bar{z}$, a vector of 256 received signal samples, $z_i = I_i + jQ_i$, i=0.255
  ES=ES+|FFT($\bar{z}$)|²
endfor
3. calculate $$ES = \frac{ES}{num\_reps};$$

4. FFT shift ES:

$$ES'(i) = \begin{cases} ES(i-128), & i = 128 \div 255 \\ ES(i+128), & i = 0 \div 127 \end{cases},$$

were ES' is the FFT shifted version of ES, throughout the remainder of this section, however, ES' is denoted as ES,
5. remove DC using:

$$ES(128) = \frac{ES(127) + ES(129)}{2};$$

Signal Presence Determination

Next, the presence of a signal is determined using the following pseudo code (step. 62).

Signal Presence Determination Pseudo Code 1. smooth the Estimated Spectrum using an 11 coefficient low pass filter (LPF) presented below in Table 5;

$$ESS(i) = \sum_{j=-5}^{5} ES(i-j)h(j), i = 0 \div 255$$

where ES(i)=0 for i<0 and i>255;

TABLE 5

| Coefficients For Low Pass Filter | | | | | | | | | | |
|---|---|---|---|---|---|---|---|---|---|---|
| $h_{-5}$ | $h_{-4}$ | $h_{-3}$ | $h_{-2}$ | $h_{-1}$ | $h_0$ | $h_1$ | $h_2$ | $h_3$ | $h_4$ | $h_5$ |
| 0.010 | 0.0249 | 0.0668 | 0.1249 | 0.1756 | 0.1957 | 0.1756 | 0.1249 | 0.0668 | 0.0249 | 0.010 |

2. calculate RES, the resolution of one bin in the FFT $$RES = \frac{SamplingFrequency}{NFFT}$$

where NFFT is defined as the number of FFT points;
3. calculate chk_rng, the range of indexes to be checked in the FFT $$chk\_rng = ceil\left(\frac{\max(3 \times 10^4, 0.7 \cdot symbol\_rate)}{RES}\right)$$

4. calculate max_chk and min_chk
  max_chk=max$\{ES_s(i)\}_{i=128-chk\_rng}^{128+chk\_rng}$
  min_chk=min$\{ES_s(i)\}_{i=128-chk\_rng}^{128+chk\_rng}$
5. calculate act_ratio $$act\_ratio = \frac{max\_chk}{min\_chk}$$

If the value of act_ratio is greater than 1.15, it is determined that a signal is present (step 64). Otherwise it is determined that no signal is present.

Correlation Calculation

The next step is to perform a correlation calculation (step 66). The following definitions apply:

ES: estimated spectrum
TS: theoretic spectrum mask
EC: an array of size 256 representing the correlation function between the non smoothed ES and the TS
LIM: the limit of the range of uncertainty.

The correlation is determined using the following pseudo code (step 66).

Correlation Determination Pseudo Code 1. calculate LIM using the following equation;

$$LIM = ceil\left(\frac{30,000 + 0.125 \cdot symbol\_rate}{RES}\right)$$

2. calculate the following;

$$EC\left(i - \left\lceil \frac{\text{length}(TS)}{2} \right\rceil\right) = \sum_{k=0}^{\text{length}(TS)-1} ES((k+i)_{\text{mod}256})TS(k),$$

$$128 - Lim < i < 128 + Lim$$

Peak Determination

The next step is to perform a peak determination algorithm (step 68). The following definitions apply:

DEC: circular difference function of EC
PI: list of peak indexes
N_WIN: the minimal distance between peaks.

The peak determination is determined using the following pseudo code.

Peak Determination Pseudo Code 1. calculate DEC using the following equation;

$$DEC(i) = \begin{cases} EC(0) - EC(255), & i = 0 \\ EC(i) - EC(i-1), & i = 1 \ldots 255 \end{cases}$$

2. find PI, for the list of indexes i which fulfill the conditions i∈PI $$\begin{cases} DEC(i) \geq 0 \text{ and } DEC(i+1) < 0, & i = 0 \ldots 254 \\ DEC(255) \geq 0 \text{ and } DEC(o) < 0, & i = 255 \end{cases}$$

3. find the value of the minimum peak and eliminate from the list those peaks that are 10 dB (0.1) smaller than the maximum peak;
4. calculate N_WIN using the following;

$$N\_WIN = \begin{cases} \text{floor}\left(0.35 \frac{NFFT}{nss}\right) & \text{symbol\_rate} \leq 64 \text{ KHz} \\ \text{floor}\left(0.175 \frac{NFFT}{nss}\right) & \text{symbol\_rate} > 64 \text{ KHz} \end{cases}$$

5. If two or more peaks are closer than N_WIN, keep the highest between them in the list. The order of the removal is from the highest peak to the lowest. Note that it is well known that the center frequencies of two signals are separated by the sum of half the signal's bandwidth, i.e., 0.7(symbol_rate$_1$+symbol_rate$_2$). In practice, since (1) the peaks of interferers are not accurately detected, (2) the peak of a small rate signal tends to get closer to the center of the high rate signal, and (3) the rate of the interferer is not known, this range should be decreased to the value given above.

Symbol Rate Calculation

The next step is to calculate the symbol rate (step 70). The following definitions apply:

BW2: one half of the bandwidth of the signal.
The symbol rate is calculated utilizing the following pseudo code.

Symbol Rate Calculation Pseudo Code 1. calculate BW2 using the following;

$$BW2 = \text{ceil}\left(\frac{0.675 \cdot \text{symbol\_rate}}{RES}\right)$$

2. calculate the following;

No_level=Mean({ES(i)|0.85·min_chk≤ES(i)≤1.25·min_chk,0≤i≤255)

3. for l=1 to the length of PI:
   3.1 define Area as:
       Area={i|PI(l)−BW2<i<PI(l)+BW2
   3.2 define Area2 as:

$$\text{Area} = \left\{ i \left| PI(l) - \frac{3}{8}BW2 < i < PI(l) + \frac{3}{8}BW2 \right. \right\}$$

3.3 find max_val:

$$\text{max\_val} = \max_{k \in \text{Area2}} ES_S(k)$$

3.4 redefine the indexes of Area2 as k such that $$ES_S(k) < \frac{\text{max\_val}}{2}$$

$$Area2 = \left\{ i \left| PI(l) - \frac{3}{8}BW2 < i < PI(l) + \frac{3}{8}BW2, ES_S(i) < \frac{\text{max\_val}}{2} \right. \right\}$$

3.5 calculate mean_val using;

$$\text{mean\_val} = \frac{\sum_{k \in \text{Area2}} ES_S(k)}{\text{number of indexes in Area2}}$$

3.6 find Fu, the smallest index in Area greater than PI(l), such that $$ES_s(F_M) \leq 0.5 \cdot (\text{mean\_val} + No\_\text{level})$$

3.7 find Fl, the highest index in Area smaller than PI(l), such that $$ES_s(F_l) \leq 0.5 \cdot (\text{mean\_val} + No\_\text{level})$$

3.8 if both Fu and Fl are found then calculate the estimated symbol rate (es_symbol_rate) corresponding to PI(l) using the following:

$$es\_\text{symbol\_rate} = (F_M - F_l) \cdot RES$$

4. end for
5. remove from the list the peaks having es_symbol_rate higher than 1.2 times the expected symbol rate or lower than 0.75 times the expected symbol rate.

If the list of peaks is exhausted, the method continues with step 60 (step 72). If the list of peaks is not exhausted, the peak closest to the center is selected (step 74).

Frequency Acquisition

The next step is to perform frequency acquisition (step 76). The following definitions apply:

FE: the normal frequency estimation pi: the peak index where a candidate signal is centered.

The frequency acquisition is performed utilizing the following pseudo code.

Frequency Acquisition Pseudo Code 1. the normal frequency estimation (FE) is calculated using the following $$FE = (pi - 128) \cdot RES$$

2. FE is output to the synthesizer and the central frequency is shifted in order that the frequency shift be compensated.

Communications is then attempted (step 78). The success of the communication attempt is then evaluated (step 80). If communications are not successful, the particular peak is deleted from the list (step 82), and the method continues with step 72). If communication is successful, the method terminates. Timing acquisition and fine frequency acquisition are then performed (described in more detail below).

Timing, Frequency and Phase Acquisition

Figure 9:
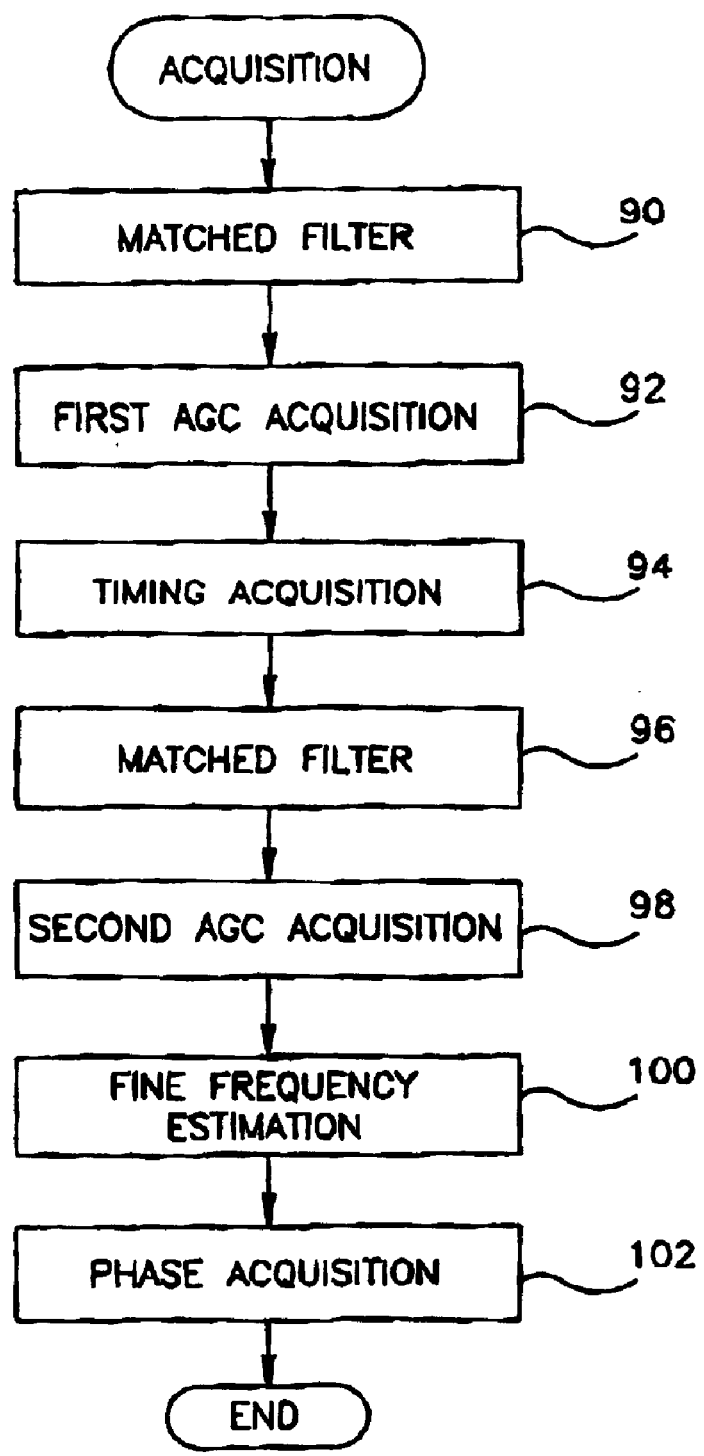
FIG. 9 is a flow diagram illustrating the timing, AGC, frequency and phase acquisition processing portion of the variable rate modem.

A flow diagram illustrating the timing, AGC, frequency and phase acquisition processing portion (step 36 FIG. 3) of the variable rate modem is shown in FIG. 9. A matched filter begins operation at a normal gear shift at 4 samples per symbol (step 90). The matched filter is implemented in hardware and operate without a phase rotation. Alternatively, the matched filter can be implemented in software. The matched filter hardware controls the clocking of the A/D converters.

The normal gear shift ratios are presented below in Table 6.

TABLE 6

Normal Gear Shift Table

| Index | Low Symbol Rate (KHz) | High Symbol Rate (KHz) | Samples/ Symbol | Low Frequency (KHz) | High Frequency (KHz) |
|---|---|---|---|---|---|
| 7 | 9.6 | 16 | 64 | 614.4 | 1024 |
| 6 | 16 | 32 | 32 | 512 | 1024 |
| 5 | 32 | 42 | 24 | 768 | 1008 |
| 4 | 43 | 64 | 16 | 672 | 1024 |
| 3 | 64 | 85 | 12 | 768 | 1020 |
| 2 | 85 | 238 | 8 | 680 | 1024 |
| 1 | 128 | 170 | 6 | 768 | 1020 |
| 0 | 170 | 256 | 4 | 680 | 1024 |

First, 128 samples are collected. At 4 samples per symbol, this is equivalent to 32 symbols. The first AGC acquisition is performed on the block of 128 samples (step 92). During this step, the following is calculated.

$$Ems = \frac{1}{N} \sum_{i=1}^{N} |Z_i|^2$$

where N=128 samples at 4 samples per symbol and the AGC value is calculated utilizing the following equation:

$$AGC = \frac{Ems}{2 \times 16^2}$$

The next step is to perform timing acquisition (step 94). The following definitions apply:

'block of symbols': 16 contiguous symbols $t_i$: DFT estimate of a block of symbols, i=1 ... N N: number of DFT estimates 'group of DFT estimates': group of N DFT estimates $T_i$: average estimate of group of N DFT estimates K: number of average estimates $T_i$, which is the number of points used as input to the Least Squares Fit.

The timing acquisition is performed utilizing the following pseudo code.

In connection with the following Pseudo Code, the following assumptions are made. (1) blocks of 16 contiguous symbols at 4 samples per symbol are available, i.e., 16*4=64 continuous samples; (2) the next block of 16 symbols arrive after a break of 16*3=48 symbols; and (3) the maximum drift between the receiver and the transmitter clocks is approximately 100 ppm.

The method of the invention utilizes the timing recovery technique described in M. Oerder and H. Meyr, "Digital Filter and Square Timing Recovery," IEEE Transactions on Communications, Vol. COM-36, pages 605 to 612, May 1988, incorporated herein by reference. The method of the invention is given briefly below.

1. Perform steps 2 through 5 for K groups made up of N DFT estimates, each calculated from blocks of 16 symbols.
2. Calculate timing estimate $t_i$, based on the DFT technique for 16 contiguous symbols, i=1, ... ,N, thereby obtaining N DFT estimates each based on 16 symbols.
3. Make a histogram (3 bins in the range of −0.5, 0.5) of the N DFT estimates $t_i$ obtained in step 2.
4. Classify the timing range (0, ¼, ½, −¼) the group the N estimates are in. The decision is derived from logic based on the histogram in step 3.
5. Unwrap N DFT estimates based on a range decision derived from logic and calculate their average $T_i$.
6. Unwrap the K average estimates $T_i$ and do a least square fit to the K averages to produce the final estimate.

Timing Acquisition Pseudo Code (in More Detail)

1. for k=1 to K perform steps 2 through 5 inclusive) groups of average estimates $T_i$);
2. calculate the timing estimate $t_i$ based on a DFT algorithm for 16 contiguous symbols, i=1 ... N, thereby obtaining N DFT estimates each based on 16 symbols contiguous at 4 samples per symbol with no discontinuity in time.

for i=1 to N $$e_r = \sum_{j=1}^{16} \{\log[1 + SNR \cdot |z(4j + 0 + 16 \cdot 4 \cdot (i-1))|^2] -$$

$$\log[1 + SNR \cdot |z(4j + 2 + 16 \cdot 4 \cdot (i-1))|^2]\}$$

$$e_i = \sum_{j=1}^{16} \{-\log[1 + SNR \cdot |z(4j + 1 + 16 \cdot 4 \cdot (i-1))|^2] +$$

$$\log[1 + SNR \cdot |z(4j + 3 + 16 \cdot 4 \cdot (i-1))|^2]$$

endfor (i=to N)
where $$SNR = \frac{E_S}{N_O}$$

and $E_s$ represents energy per symbol.
The preliminary estimate is then given by the following $$t_i = \frac{1}{2 \cdot pi} \arctan\left(\frac{e_i}{e_r}\right)$$

Note that the arctan function can be approximated using the least squares method and the logarithm is the natural logarithm to the base 'e'.

3. construct a histogram of the N DFT estimates $t_i$ wherein 3 bins in the range −0.5 to 0.5.
3.1 count the number of estimates $t_i$ in each bin as defined by
bin 1=[−0.5, −⅙]
bin 2=[−⅙, ⅙]
bin 3=[⅙, 0.5]
3.2 sort counts of the three bins in descending order and save their respective indices as follows:
max=value of the maximum count
mid=value of the middle count
min=value of the minimum count
$I_{max}$=index of the bin with the maximum count
$I_{mid}$=index of the bin with the middle count
$I_{min}$=index of the bin with the minimum count
4. classify the portion of the timing range the group of N estimates are in;
range 1=around zero, i.e., [−⅛, ⅛]
range 2=around ¼, i.e., [⅛, ⅜]
range 3=around ½ or −½, i.e., [−½, ⅜] and [⅜, ½]
range 4=around −¼, i.e., [⅜, −⅛]
if (max≧10) & (mid+min≦6) then
  if $I_{max}$==2 then
    range=1; time round 0
  elseif $I_{max}$==1
    range=4; time negative
  else
    range=2; time positive
  end
else
  if $I_{min}$==2 & (max−mid≦4)
    range=3; time round ½
  elseif $I_{min}$==1
    range=2; time positive
  else
    range=4; time negative
end
5. unwrap N DFT estimates based on the range decision and calculate their average $T_k$ using the following pseudo code;
Average $T_k$ Calculation Pseudo Code
5.1. initialize thresholds:
  thrmid=0.25
  thrhlf=0.05

5.2. calculate $$mean = \frac{\sum t_i}{N},$$

% average of DFT estimates before unwrapping
5.3. do for group of estimates i=1 to N
  sgn=0% case on value of the variable 'range'
  case 1
    NOP
  case 2
    if t<−thrmid then sgn=1;
  case 3
    if mean>0
      if $t_i$<−thrmid then sgn=1;
    else
      if $t_i$>thrhlf then sgn=−1;
    end
  case 4
    if $t_i$>thrmid then sgn=−1;
end;
end do for group of estimates
5.4. calculate the average estimate of the group of N DFT estimates as follows $$T_k = \frac{\sum t_i}{N}, i = 1 \ldots N,$$

% calculate average estimate
endfor (k=1 to K)
6. unwrap the K average estimates $T_i$ and do a least square fit to the K averages to yield the final estimate;
We assume that $T_i$ depends linearly on time. The observation interval, however, is limited to the range [−0.5, 0.5].
6.1 unwrapping the K average estimates.
The first step is to unwrap the K average estimates and receive new values $T_i$ for $$i = -\frac{K-1}{2}, \ldots, \frac{K+1}{2}$$

for odd K.
Unwrapping Pseudo Code

1. Detect positive and negative jumps in timing that are larger than 0.5. A positive jump is detected if $$T(jp+1)-T(jp) \geq 0.5$$

A negative jump is detected if $$T(jn+1)-T(jn) < 0.5$$

where T(j) are the time estimates and j is the time index.
2. For positive jumps at index jp, subtract 1 from all subsequent time estimates (with indices≧jp.
3. For negative jumps at index jn, add 1 to all subsequent time estimates (with indices≧jn.

6.2 Calculate estimates of the slope a and the average b of the $T_i$, i=1 to K, using a least square fit estimation. The estimate is calculated to be:

$$T = \frac{a \cdot (K-1)}{2} + b$$

with no prediction, or $$T = a \cdot \left[ \frac{(K-1)}{2} + p \right] + b$$

with a prediction of p=½ or p=1.

Where b and a are calculated by a least square fit to a linear curve given by $$\hat{b} = \frac{1}{N} \sum_{i=-(K-1)/2}^{(K-1)/2} T_{i+(K-1)/2+1} \text{ and } \hat{a} = \frac{\sum_{i=-(K-1)/2}^{(K-1)/2} i \cdot T_{i+(K-1)/2+1}}{\sum_{i=-(K-1)/2}^{(K-1)/2} i^2}$$

for odd K. The indices are chosen so that the first $T_i$ generated is multiplied by (K−1)/2.

With reference to FIG. 9, once the timing has been acquired, the next step is to apply a matched filter (step 96). The matched filter is applied using 1 sample per symbol at the filter output with no phase rotation. The next step is a second AGC acquisition on a block of 128 samples at 1 sample per symbol (step 98).

At 1 sample per symbol, 32 samples are collected. The second AGC acquisition is performed on the block of 32 samples. During this step, the following is calculated.

$$Ems = \frac{1}{N} \sum_{i=1}^{N} |z_i|^2$$

where N=128 samples at 4 samples per symbol and the AGC value is calculated utilizing the following equation:

$$AGC = \frac{Ems}{2 \times 16^2}$$

Figure 10:
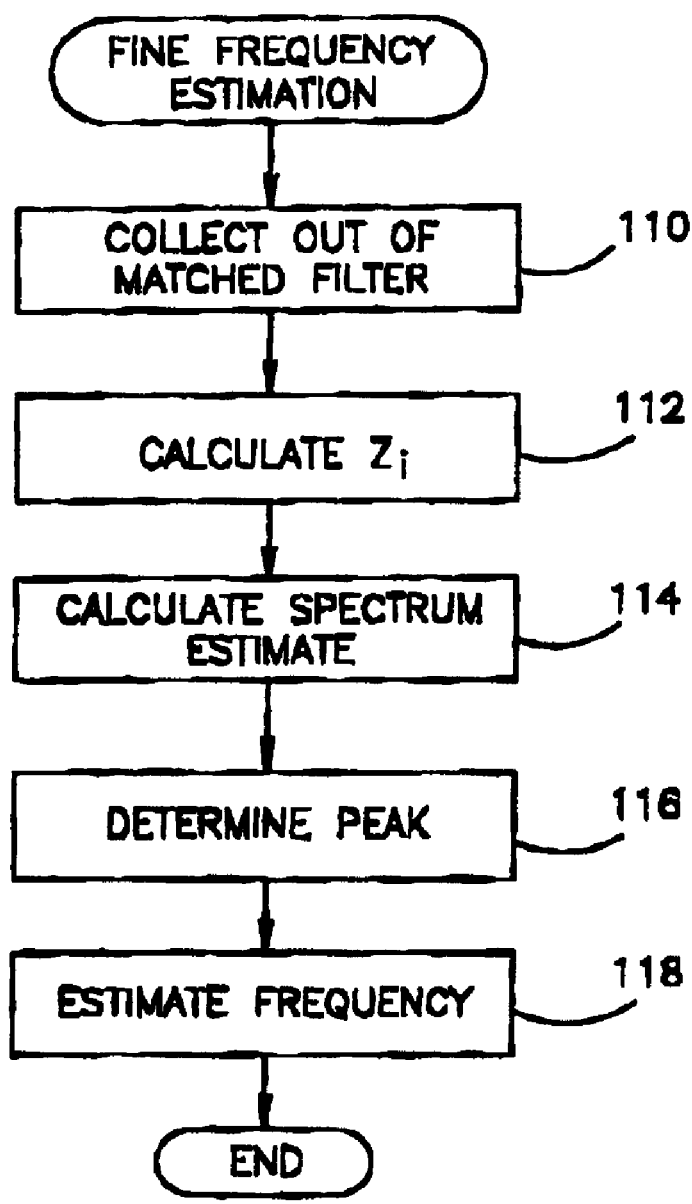
FIG. 10 is a flow diagram illustrating the fine frequency estimation processing portion of the variable rate modem.

The next step is to perform fine frequency estimation (step 100). The fine frequency estimation is performed on the output of the matched filter after timing acquisition has been performed. Note that in order to increase performance at low SNRs, preferably two periodograms are averaged rather than using only one. A flow diagram illustrating the fine frequency estimation processing portion of the variable rate modem is shown in FIG. 10.

The following definitions apply:
NFFT: the number of bins in the FFT, 256 for high SNR and 1024 for low SNR
PADD: zero padding fraction, 0 for high SNR and 0.5 for low SNR With reference to FIG. 10, the timing acquisition is performed utilizing the following pseudo code.

Fine Frequency Acquisition Pseudo Code
1. for i=to NFFT*PADD−1
   collect the output of the matched filter (step 110)
   $z_i = I_i + jQ_i$ at the correct time epoch (step 112);
   do $z_i = z_i^4$ in two stages:
      calculate $Z_i^2 = u_i + jw_i$, where $u_i = I_i^2 - Q_i^2$, $w_i = 2I_iQ_i$
      calculate $z_i^4 = x + jy_i$, where $x_i = u_i^2 - w_i^2$, $y_i = 2u_iw_i$
2. calculate a NFFT point of $\{z^4$ with NFFT*PADD zeros padded (step 114). The absolute value of the FFT squared is denoted by ES.

FFT shift ES:

$$ES'(i) = \begin{cases} ES\left(i - \frac{NFFT}{2}\right), i = \frac{NFFT}{2} \div NFFT - 1 \\ ES\left(i + \frac{NFFT}{2}\right), i = 0 \div \frac{NFFT}{2} - 1 \end{cases}$$

where ES' is the FFT shifted version of ES. From here on in, ES' is denoted by ES.
3. find the maximum of $\{ES_i\}_{i=0}^{NFFT-1}$ (step 116);
4. find the index of the peak denoted by peak_index;
5. the frequency estimation (step 118) is given as $$\frac{1}{4} \cdot \frac{\text{symbol\_rate}}{NFFT} \cdot \left(\text{peak\_index} - \frac{NFFT}{2}\right)$$

6. alternatively, better results can be achieved if the modulation wipe off is performed as follows $$(I_i^2 + Q_i^2) \exp\left(4j \arctan\left(\frac{Q_i}{I_i}\right)\right) = \frac{(Q_i - jI_i)^4}{I_i^2 + Q_i^2} = \frac{(I_i - jQ_i)^4}{I_i^2 + Q_i^2}$$

7. an approximation of the modulation wipe off can be achieved using the following:
7.1 $\upsilon = \lfloor \log_2(I_i^2 + Q_i^2) \rfloor$.
This can be performed using iterated comparisons. The iteration is through the values $-3 \leq \upsilon \leq 4$.
7.2 The wipe off is performed by $$\frac{(Q_i - jI_i)^4}{2^\upsilon}$$

With reference to FIG. 9, the next step is to perform phase acquisition (step 102). The input to the phase acquisition portion of the method is $Z_n$ which are complex samples (I and Q) at a rate of 1 sample per second. The value of N is equal to 16 complex samples. One assumption made is that the frequency offsets are smaller than $$\frac{1}{8 \cdot N \cdot T}$$

where T is the symbol period, i.e., for N=16, less than ¹⁄₁₂₈ of the symbol rate that is approximately the maximum frequency error.

The phase acquisition process receives N complex samples (N=16) and functions to determine the rotation angle that brings the samples after modulation wiping to a minimum variance. I and Q are the in phase and quadrature components, respectively.

$$z_n = I_n + jQ_n, n = 0 \ldots N-1$$

The method consists of two stages: (1) a coarse grained search that chooses between 4 'hypothesis' of signal rotation with modulation unwiping in the first quadrant and (2) a fine estimation of the phase rotation angle. The role of the operation $z^4$ is to wipe off the effect of the QPSK modulation on the phase. Before this operation, the phase of z is the sum of an unknown phase and of the phase due to modulation. After this operation, the phase depends less on the data.

Figure 11:
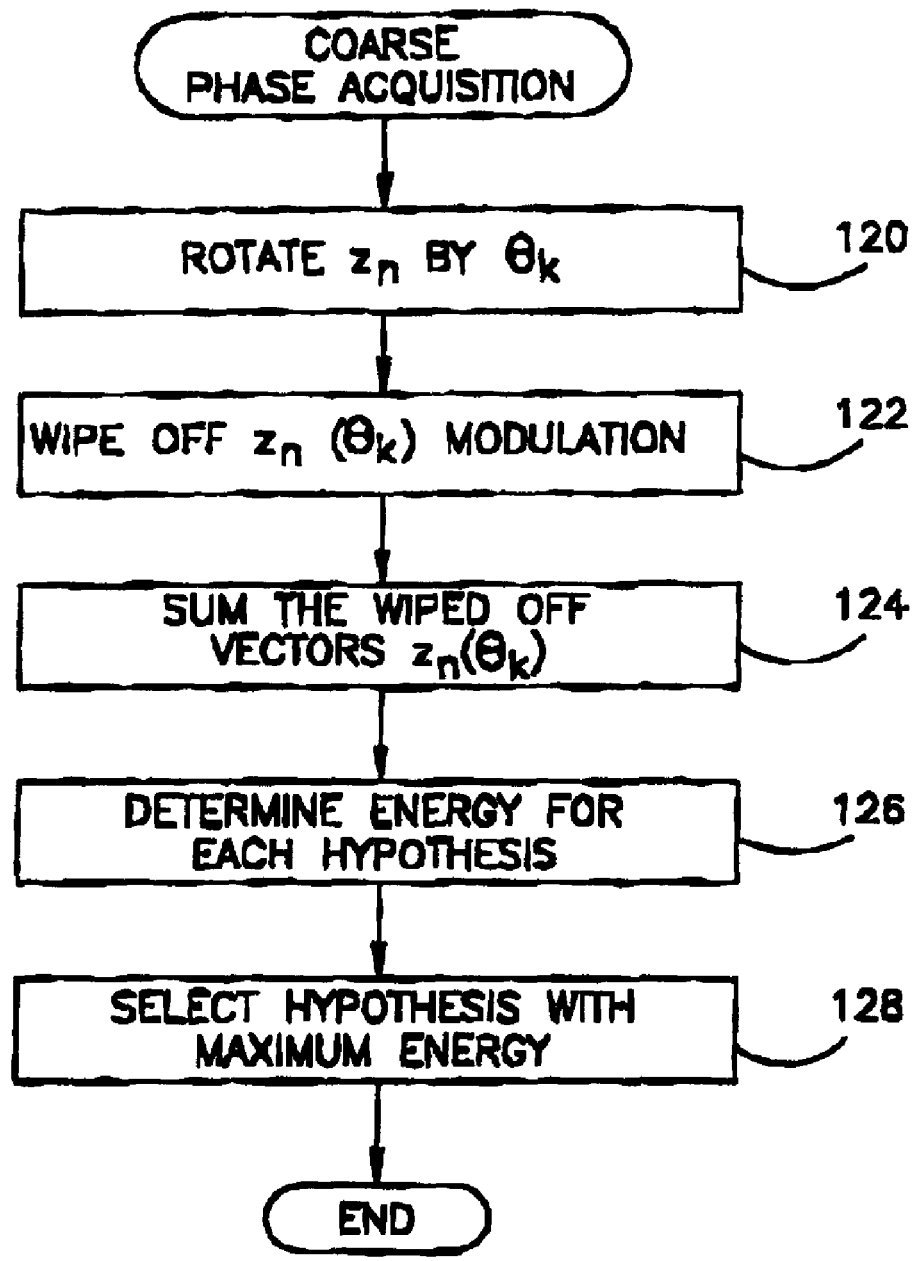
FIG. 11 is a flow diagram illustrating the coarse phase acquisition processing portion of the variable rate modem.

A flow diagram illustrating the coarse phase acquisition processing portion of the variable rate modem is shown in FIG. 11. A flow diagram illustrating the fine phase acquisition processing portion of the variable rate modem is shown in FIG. 12.

Figure 12:
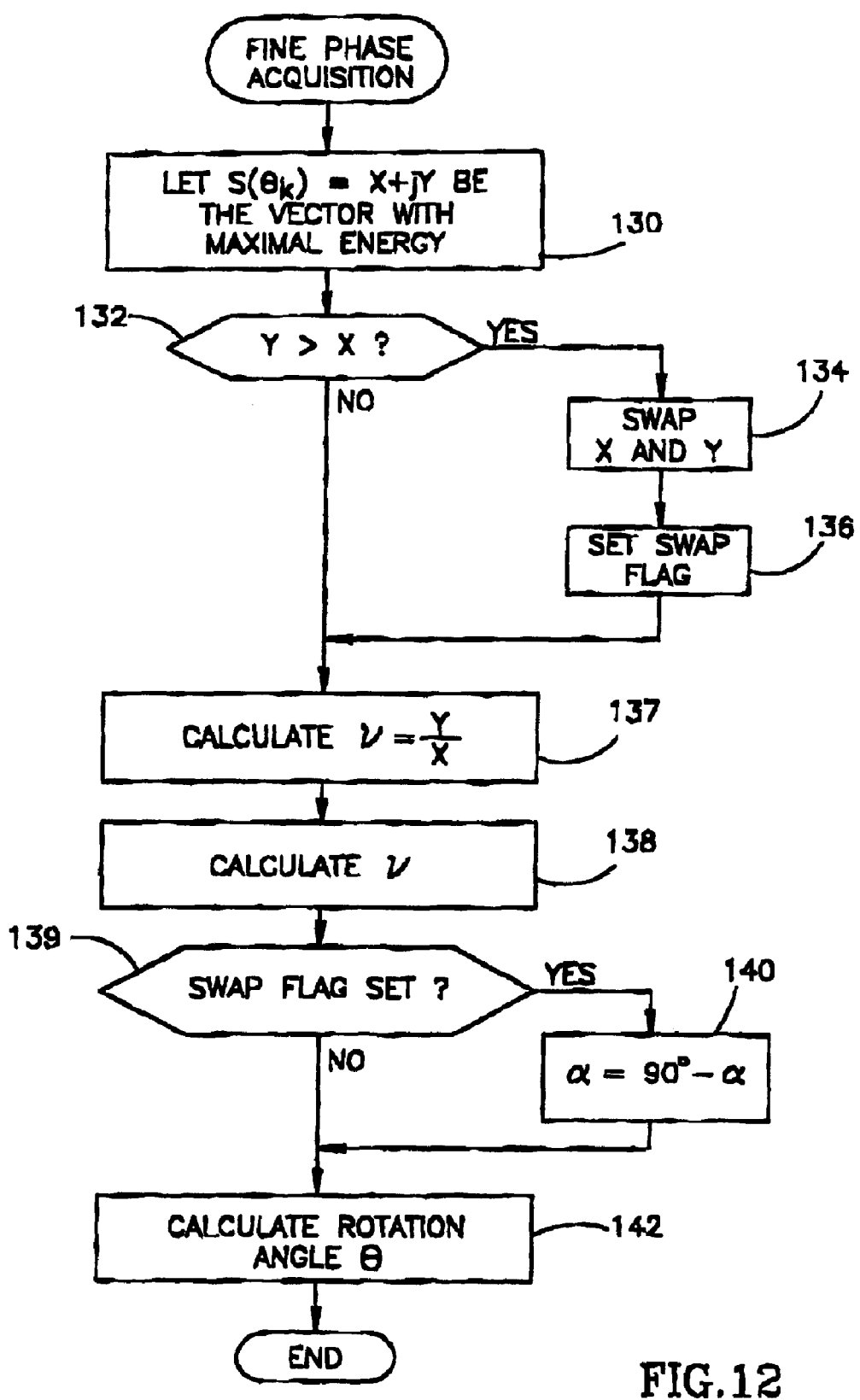
FIG. 12 is a flow diagram illustrating the fine phase acquisition processing portion of the variable rate modem.

With reference to FIGS. 11 and 12, the pseudo code for the phase acquisition follows.

Phase Acquisition Pseudo Code

1. Coarse Grained Search 1.1 for hypothesis Hk; k=1, 2, 3, 4, . . . rotate $z_n$ by adding the phase $\Theta_k$=k·22.5° (step 120) in accordance with $$z_n(\Theta)=z_n \cdot e^{j\Theta_k}$$

1.2 wipe off $z_n(\Theta_k)$ modulation as follows (step 122):
for each $z_n$=$I_n$+j$Q_n$
check in which quadrant it appears
if $I_n Q_n$<0 then swap $I_n$ and $Q_n$
take the absolute value of $I_n$ and $Q_n$ such that $Z_n$ is now in the first quadrant;

$$z_n=|I|+j|Q|$$

endfor 1.3 sum the wiped off (or rotated) vectors $z_n(\Theta_k)$ using the following (step 124) (note that the sum should continue until N−1=15)

$$S(\Theta_k) = \sum_{n=0}^{7} Z_n(\Theta_k)$$

1.4 find the energy for each of the hypothesis (step 126) using $$E(\Theta_k)=|S(\Theta_k)|^2$$

At this point, it is relatively easy to show that for a rotational transformation, the minimum variance condition is equivalent to finding the maximum energy.

1.5 choose the hypotheses with maximum energy $E(\Theta_{k1})$ (step 128).

2. 'Fine' Phase Estimate 2.1 let $S(\Theta_k)$=X+jY (step 130) be the vector having maximum energy; if Y>X (step 132) then swap X and Y (step 134) and set a swap_flag (step 136);

2.2 calculate $\alpha$=atan(Y/X) using the techniques described below in 2.2.1 to 2.2.4 (step 130);

2.2.1 find a quadratic fit for the inverse term u=1/x

'normalize' X to the range of [0.5 . . . 1] which can be performed using left shift operations as follows $$\bar{x}=2^m \cdot x$$

$$u=4.2349\bar{x}^2-5.8354\bar{x}+2.6192$$

2.2.2 calculate $$v = \frac{y}{x} = 2^{-m} \cdot (y \cdot u)$$

where the 'unnormalization' by a factor of $2^m$ is performed using right shifts (step 137);

2.2.3 calculate $\alpha$=atan(v) using a quadratic fit (step 138):

$$\alpha=-0.0052v^2+1.0804v-0.2886$$

Note: (1) these coefficients are scaled in radians;
(2) this approximation assumes that 0<v<1 which is true because v=x/y and 2.1 assures that x>y;

2.2.4 if the swap_flag is set (step 139) than a=90°—a (step 140);

2.3 the rotation angle $\Theta$, which must be subtracted from the phase of the samples $z_n$, is given as $$\Theta=\Theta_k+\alpha-45° \text{ (step 142)}$$

2.4 the rotation by $\Theta$ yields $$z_n=z_n e^{-j\Theta}$$

This rotation brings in the received signal at phase $\pm\pi/4$, $\pm3\pi/4$, etc. in accordance with the data (for noiseless signals). Note that steps 132, 134, and 136 through 140 comprise the detail implementation following step 130.

The rotation angle $\Theta$ obtained during acquisition is the initial phase of the phase control loop.

Figure 13:
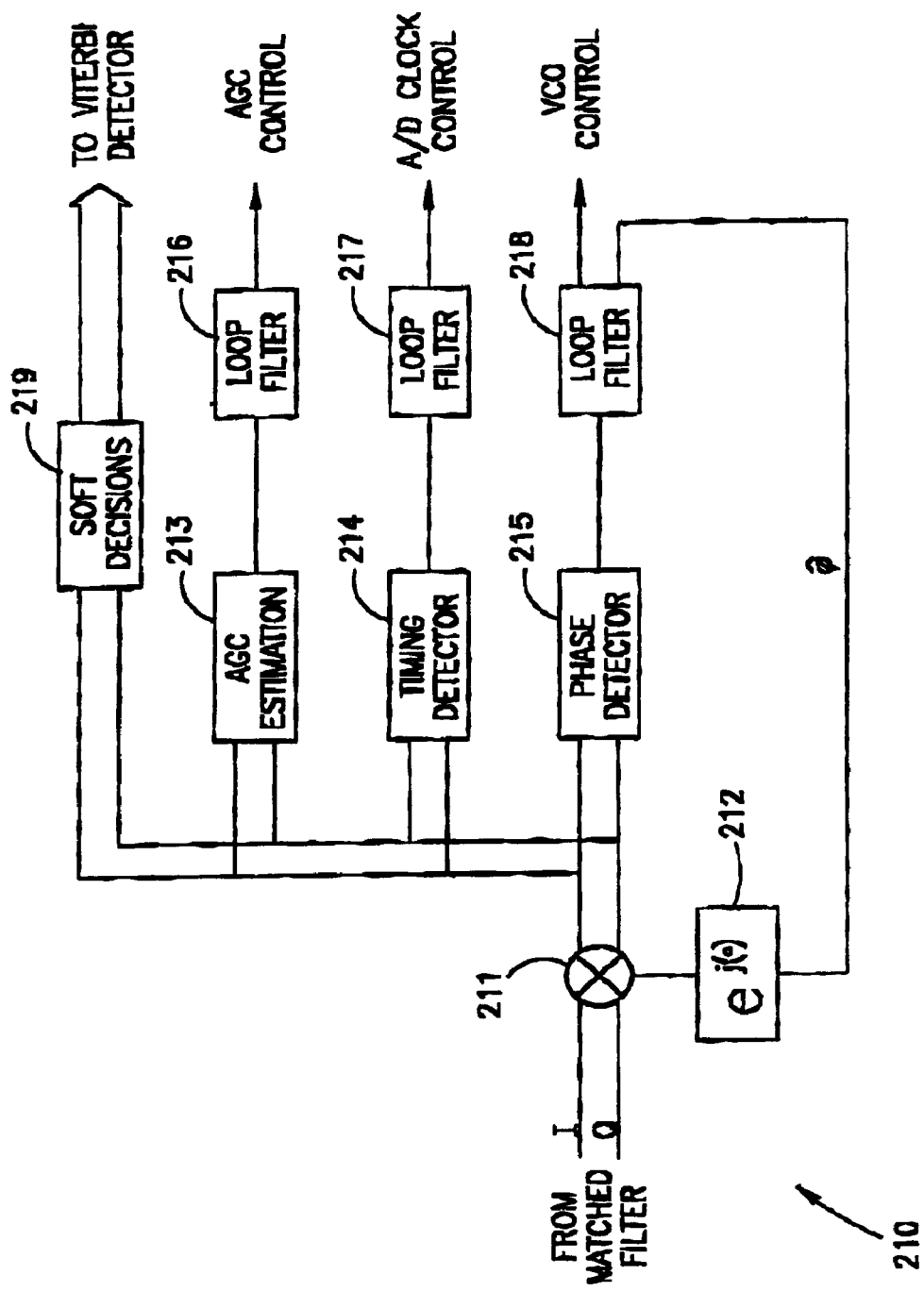
FIG. 13 is a block diagram illustrating tracking portion of the variable rate modem.

A block diagram illustrating pre-tracking and tracking portion of the variable rate modem 210 is shown in FIG. 13. This block diagram describes both the pre-tracking and tracking stages of the main loop processing. The I and Q data output from the matched filter is input to a mixer (multiplier) 211. The I and Q output of the mixer 211 is input to AGC estimation 213, timing detector 214 and phase detector 215.

The AGC estimation 213 functions to generate an AGC control based on the energy or average power of the input signal. The AGC control is passed through a loop filter 216 before being applied to the AGC hardware in the IF module section 16 (FIG. 1).

The timing detector 214 functions to generate a noisy timing estimate which is first filtered via loop filter 217 before being applied to the clock generation circuitry (not shown) in the A/D converter section of the baseband module 18. The A/D clock control signal output from the loop filter 217 functions to adjust and correct for clock timing errors in the A/D converters.

The phase detector 215 functions to generate a noisy phase estimate that is input to the loop filter 218. One signal output of the loop filter comprises a VCO control signal which is input to the VCO circuitry (not shown) in the IF module 16. The VCO control signal functions to raise or lower the frequency output of the VCO. A second signal output of the loop filter 218 is the phase estimate φ that is fed into the $e^{j(\cdot)}$ block 212. This block functions to correct for phase and small frequency offsets. The output of the block constitutes the second input to the I/Q mixer 211.

The I and Q output of the mixer 211 is also input to the soft decision block 219. The matched filter outputs $z_n$, after time synchronization, frequency and phase correction, must pass the soft decision block 219 before being input to Viterbi detection in the Viterbi decoder (not shown) in the baseband module 18 (FIG. 1) (see also step 158 FIG. 14). This process is performed on $I_n$ and $Q_n$ independently. The Viterbi decoder receives for each $I_n$ and $Q_n$, 3 or 4 bits of quantization. The exact number depends on the specific Viterbi detector. One of the bits is the sign and the other bits describe the signal level.

For example, if the level thresholds are $\alpha_1<\alpha_2<\alpha_3$, the two bits of soft decision which describe the level are shown below in Table 7:

TABLE 7

| $I_n$ | Bit Representation |
|---|---|
| $I_n < \alpha_1$ | 00 |
| $\alpha_1 < I_n < \alpha_2$ | 01 |
| $\alpha_2 < I_n < \alpha_3$ | 10 |
| $\alpha_3 < I_n$ | 11 |

Figure 14:
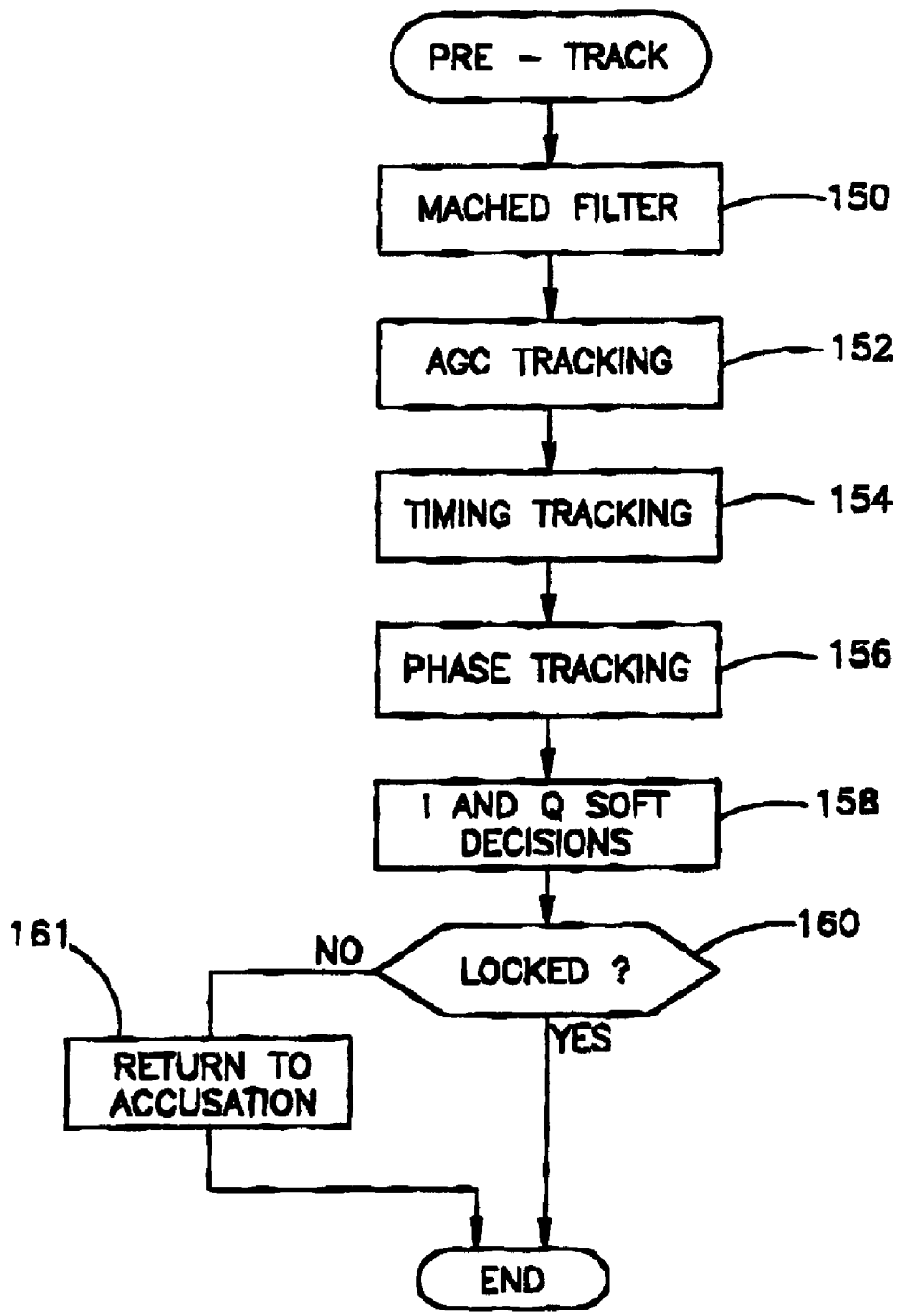
FIG. 14 is a flow diagram illustrating the pre-track processing portion of the variable rate modem.

With reference to FIG. 3, once the acquisition stage is complete, pre-tracking can be performed (step 37). The pre-track stage is in principle normal tracking of AGC and timing, while the phase tracking loop has a larger bandwidth and the 90° ambiguity still must be resolved. A flow diagram illustrating the pre-track processing portion of the variable rate modem is shown in FIG. 14.

The method comprises (1) AGC tracking as described hereinabove, (2) timing tracking using a method that operates on a group of symbols (at one sample per symbol) to generate an estimate that is filtered using a single pole IIR filter; the method is called at a rate of approximately 160 Hz which 32 symbols being processed each time, and (3) phase tracking performed once per symbol for symbol rates below 64 KHz and once every 2 or 4 symbols for higher symbol rates. The criteria for declaring tracking lock can be a timeout, a high raw BER or one or more lock detectors.

Figure 15:
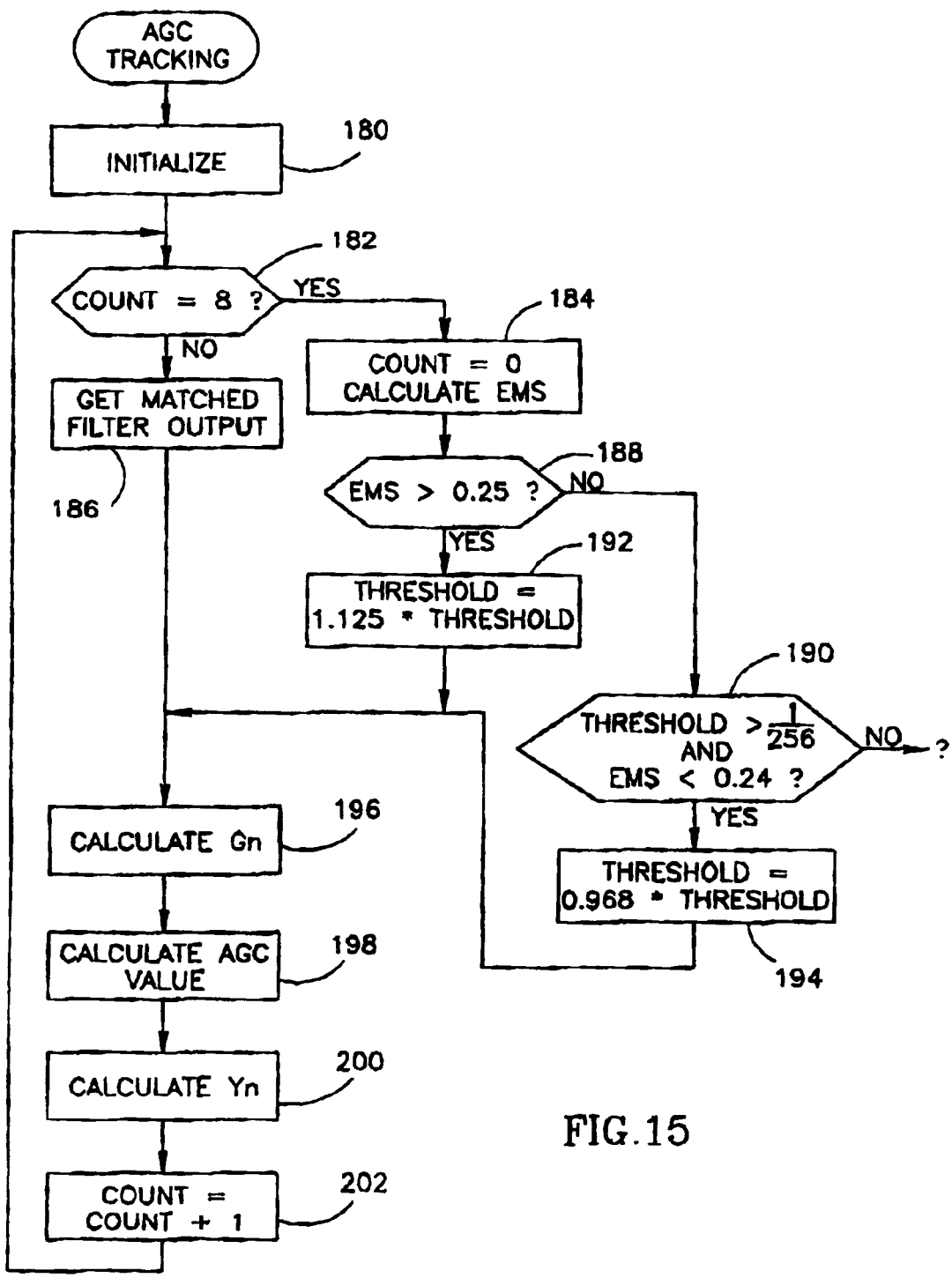
FIG. 15 is a flow diagram illustrating the AGC tracking portion of the variable rate modem.

First, the I and Q data is input to the matched filter (step 150). AGC tracking is then performed on the output of the matched filter (step 152). A flow diagram illustrating the AGC tracking portion of the variable rate modem is shown in FIG. 15. The pseudo code for the AGC tracking follows.

AGC Tracking Pseudo Code
1. initialize variables including 'count' and set the threshold to 256 (step 180);
2. check if count=8 (step 182);
3. every T milliseconds (T≈100 ms) receive the output $z_n$ (n represents one sample per symbol) of the matched filter (step 186) while count is <8;
4. calculate $g_n$ as follows (step 196)

$$g_n = \text{Treshold} \cdot |z_n|^2$$

5. calculate AGC value (step 198). Filter $g_n$ using a Butterworth low pass filter (LPF) transfer function shown below $$H(z) = \frac{0.073 \cdot (1 + z^{-1})}{1 - 0.854 \cdot z^{-1}}$$

with a 3 dB cutoff rate at 0.1 of the digital Butterworth LPF. The corresponding difference equation is as follows $$G_{n+1} = 0.854 \cdot G_n + 0.0730 \cdot (g_n + g_{n-1})$$

6. the output $Y_n$ of this filter is the new 'inverse AGC' (in the energy domain) (step 200).

$$AGC = \frac{1}{G_n}$$

7. to prevent clipping at the input to the A/D converter, the threshold is adapted every K*T ms (K≈8, 16).
8. find $Y_n$ in an inverse_AGC_table and write the value to the AGC circutry in the IF module;
9. increment count by one (step 202);
10. after N samples (N=8 in he above example) reset count to 0 and calculate Ems (step 184);

$$Ems = \frac{1}{N} \sum_{i=1}^{N} |Z_i|^2$$

10. if Ems>0.25 (step 188) then increase the threshold (step 192);

Threshold=α·Threshold, α1+⅛ else if the threshold>1/256 AND Ems<0.24 (step 190) then decrease threshold (step 194);

Threshold=β·Threshold, β≈1-1/32 endif.

Figure 16:
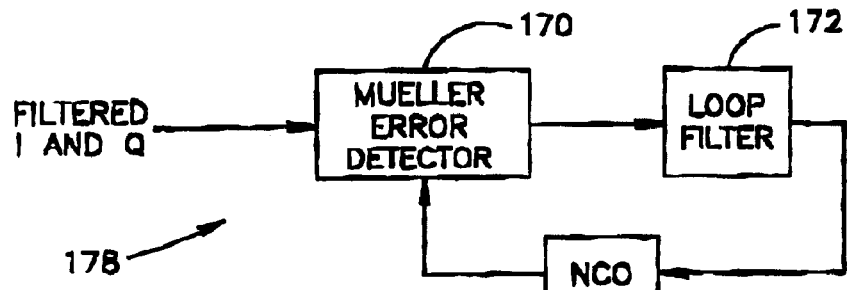
FIG. 16 is a block diagram illustrating a model of the timing tracking portion of the variable rate modem.

With reference to FIG. 14, the next step is to perform timing tracking (step 154). The timing tracking portion comprises a loop filter, an ideal integrator and an inherent numerically controlled oscillator (NCO). A block diagram illustrating a physical model of the timing tracking portion of the variable rate modem is shown in FIG. 16. The filtered I and Q data at 1 sample per symbol, i.e., the output of the mixer 211 (FIG. 13), is input to a Mueller error detector 170. The output of the error detector 170 is input to a loop filter 172. The output of the filter constitutes the A/D clock control signal. This signal is input to NCO 174 that functions to generate the clock for the A/D converter. The output of the NCO is also fed back to the Mueller error detector 170.

The timing signal model of the loop filter 172 can be represented as the following $$\beta \frac{1 - \gamma z^{-1}}{1 - z^{-1}}$$

and the NCO can be represented as $$\frac{1}{1 - z^{-1}}$$

Note that the loop filter has a gain of β, an ideal integrator and a zero at γ, i.e., proportional and derivative control. The timing tracking loop utilizes the Mueller and Mueller timing error detector 170 which operates on the filtered in-phase and quadrature components on a block of 32 symbols at a rate of approximately 320 Hz (determined by the operating system). The timing error detector is given by the average of the I and Q error components:

$$\varepsilon_n = \frac{\varepsilon_i + \varepsilon_Q}{2K}$$

where $\epsilon_{In} = I_{n \cdot sgn(In-1)} \cdot sgn(I_n)$ $\epsilon_{Qn} = Q_{n \cdot sgn(Qn-1)} \cdot sgn(Q_n)$ and K=$\frac{1}{16}$ is the nominal value of the signal amplitude as set by the AGC. Next, the average of a block size N=32 is computed as follows:

$$E_n = \frac{1}{N} \sum_{i=0}^{N-1} \varepsilon_{n-i}$$

The error process is filtered by the loop filter 172 as follows:

$$t_n t_{n-1} = \beta(E_n - \gamma E_{n-1})$$

where $t_n$ is the correction written to the hardware. The NCO 174 or ideal integrator is part of the system and may or may not be implemented in software. It should, however, be taken into account when calculating the closed loop transfer function. Based on the timing signal model given above and the assumption that the error detector is ideal, i.e., it yields the exact timing error), the closed loop transfer function of the estimated timing epoch is given by $$\frac{\hat{T}}{T} = \frac{\beta(1 - \gamma z^{-1})}{1 + (\beta - 2)z^{-1} + (1 - \beta\gamma)z^{-2}}$$

Note that it is convenient to construct the filter using the classical parameters from continuous time in terms of $\omega_n = 2\pi f_n$, the natural frequency and $\xi$, the damping factor. it is desirable to express $\beta$ and $\gamma$ in terms of $\omega_n$ and $\xi$. This can be achieved in two stages. The first stage is to convert to the discrete time domain standard form by solving the following set of equations:

$$\begin{cases} (\beta - 2)z^{-1} = -2r\cos\theta z^{-1} \\ (1 - \beta\gamma)z^{-2} = r^2 z^{-2} \end{cases}$$

from which we obtain $$\begin{cases} r = \sqrt{1 - \beta\gamma} \\ \theta = \cos^{-1}\left(\frac{2 - \beta}{2r}\right) \end{cases}$$

or for the other direction $$\begin{cases} \beta = 2(1 - r\cos\theta) \\ \gamma = \frac{1 - r^2}{\beta} = \frac{1 - r^2}{2(1 - r\cos\theta)} \end{cases}$$

We now express r and $\theta$ in terms of the design parameters $\omega_n$ and $\xi$ as follows.

$$\begin{cases} r = e^{-\xi \omega_n T} \\ \theta = \omega_n T \sqrt{1 - \xi^2} \end{cases}$$

This is described in more detail in Best, Phased Locked Loops, Second Edition, p. 342, McGraw Hill, 1993. In addition, a more detailed description of the timing error detector 170 is given in IEEE Transactions on Communications, May 1976, pp. 516 to 530.

The following is based on the assumption that the timing error detector gain is unity. The detector gain will now be discussed in more detail. The transformation is based on the impulse invariance conversion from continuous to discrete time. From r and $\theta$ we can compute $\beta$ and $\gamma$. Based on the above equations, assuming an operating rate of 1/T=320 or 640 operations per second and setting $\xi$=0.707, the parameters for $\beta$ and $\gamma$ are presented below.

TABLE 8

| | Parameters $\beta$ and $\gamma$ | | |
|---|---|---|---|
| $f_n$ (Hz) @ 320 Hz | $\beta$ | $\gamma$ | $f_n$ (Hz) @ 640 Hz |
| 0.1 | 0.0028 | 0.9986 | 0.2 |
| 0.2 | 0.0056 | 0.9972 | 0.4 |
| 0.32 | 0.0089 | 0.9956 | 0.64 |
| 0.5 | 0.0139 | 0.9931 | 1 |
| 1 | 0.0278 | 0.9863 | 2 |
| 1.6 | 0.0444 | 0.9783 | 3.2 |
| 2 | 0.0555 | 0.9730 | 4 |
| 3.2 | 0.0888 | 0.9575 | 6.4 |
| 5 | 0.1386 | 0.9351 | 10 |
| 7.5 | 0.2075 | 0.9058 | 15 |
| 10 | 0.2760 | 0.8784 | 20 |

The choice of $\xi$=0.707 is due to the dependence of the gain on the error detector which is a function of the AGC and the signal to noise ratio.

Figure 17:
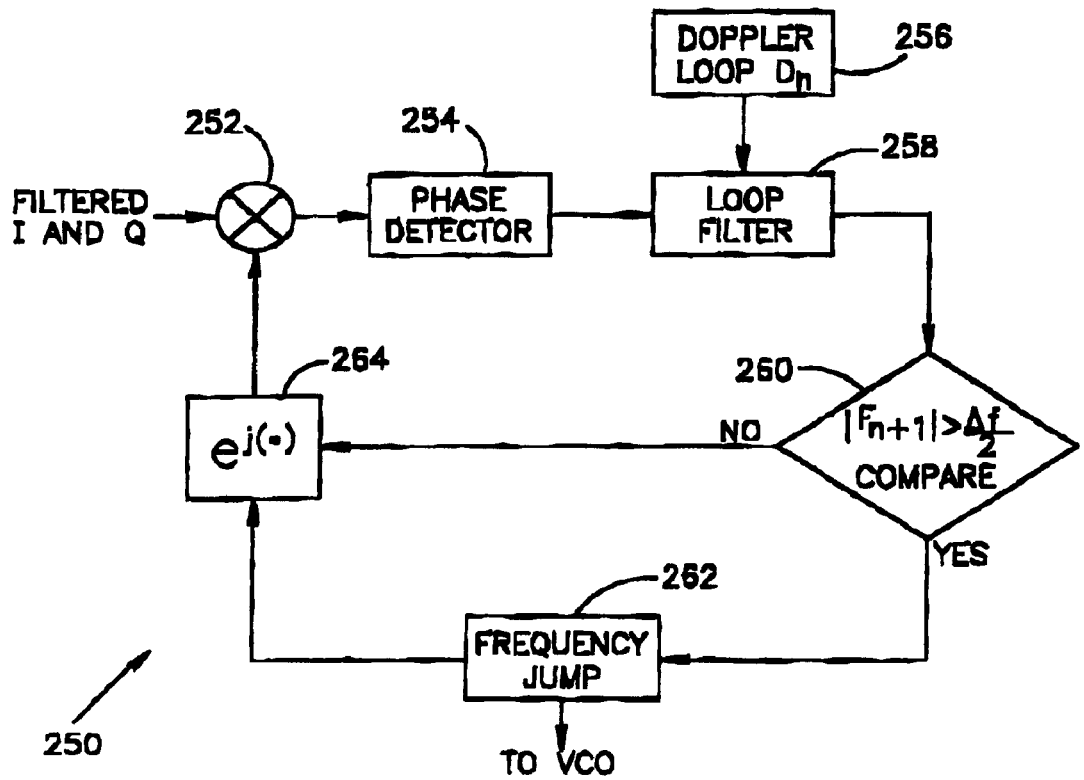
FIG. 17 is a block diagram illustrating the phase tracking portion of the variable rate modem.

With reference to FIG. 14, the next step after timing tracking is phase tracking (step 156). A block diagram illustrating the phase tracking portion of the variable rate modem is shown in FIG. 17. The phase tracking portion 250 comprises three main components including a phase detector 254, loop filter 258 and a frequency jump 262 if the frequency is larger than a threshold.

The phase tracker mainly operates at the symbol rate. For higher data rates, real time constraints may pose a problem. For high symbol rates it may be necessary to operate the phase tracking at rates slower than the symbol rate.

The filtered I and Q data is input to a mixer 252. The output of the mixer 254 is input to the phase detector 254. The QPSK phase detector performs the following:

$$\epsilon_n = Q_n \cdot sgn(I_n) - I_n \cdot sgn(Q_n)$$

where I and Q denote in-phase and quadrature components respectively, at a rate of once per symbol.

The output of the phase detector is input to a loop filter 258. The filter is presented in state space representation. The filter is defined by the parameters $a_0$ and $a_1$. The Doppler estimate $D_n$, is preferably also input to the filter from an external loop 256. The equations shown below wherein $F_n$ and $P_n$ denote the frequency and phase, respectively. Note that the phase $P_n$ is the same phase discussed earlier denoted $\phi$ or $\Theta$. The filter preferably comprises an infinite impulse response (IIR) filter. The loop filter performs the following:

$$F_n + 1 = a_1(P_n - P_{n-1}) + b_1 F_n + D_n$$

$$P_n + 1 = b_0 \epsilon_n + P_n + F_{n+1} - D_n$$

where $\epsilon_n$ is the phase error from the phase detector and $a_1 = 1 - b_1$.

If the frequency $F_n$ in the filter is large, a jump in the direct digital synthesizer (DDS) or other similar frequency source is performed having a size $\Delta f$. A typical value of $\Delta f$ corresponds to 10 Hz.

The absolute value of the output of the loop filter $F_{n+1}$ is compared against a threshold via a compare block 260 that performs the following comparison:

$$|F_{n+1}| > \frac{\Delta f}{2}$$

If the expression is true then jump $\Delta f$ in the opposite direction via frequency jump 262. Note that the $F_n$ and threshold values are in units of Radians/operating period.

The data is written to the direct digital synthesizer (DDS) using frequency jump unit 262 in accordance with the following synthesizer_freq=synthesizer_freq+$\Delta f$ Note that the quantity $\Delta f$ is in units of Radians/operating period.

The following variables apply:

$$P_n = P_n - \frac{\Delta f}{2} \cdot \text{sgn}(F_n)$$

$$F_n = F_n - \Delta f \cdot \text{sgn}(F_n)$$

It is assumed that the Doppler variable is zero. For a non-zero Doppler value one skilled in the art can modify the above equations to include the Doppler variable.

Note also that the Doppler estimates are supplied from an external loop uncoupled to the IIR filter.

The output of the frequency jump 262 and the compare 260 are input to the $e^{j(\cdot)}$ block 264. The output of block 264 forms the second input of the mixer 252.

The transfer function of the IIR used in the loop filter 258 will now be described in more detail. by taking the Z transform of the two IIR equations ($F_{n+1}1$, $P_{n+1}1$) and substituting $$\epsilon_n \phi_n - P_n$$

where $\phi_n$ is the phase of the input signal (linear approximation), we obtain:

$$\frac{\phi_n}{P_n} = \frac{b_0(1 - b_1 z^{-1})}{1 - (1 + a_0)z^{-1} + (a_0 b_1 + a_1)z^{-2}}$$

Note that it is convenient to use the normalized form for a second order system, i.e., to define the system by $\xi=1$ or $$\frac{\sqrt{2}}{2}$$

and $\omega_n$ which is determined by the required lock range, Doppler offset or output signal to noise ratio (SNR). A damping coefficient of $\xi=1$ is recommended for reducing cycle slips as described in Ascheid and Meyr, "Cycle Clips in PLLs: A Tutorial Survey," IEEE Transactions in Communications, Vol. 30, October 1982, pp. 2228 to 2241. For acquisition it is preferable to use a smaller damping coefficient in the range $\xi=0.5$ to $$\frac{\sqrt{2}}{2}$$

which yields a faster response with an overshoot of 18% for $\xi=0.5$.

After phase tracking is accomplished, the I and Q soft decisions are output to the Viterbi decoder (not shown) (step 158). Whether signal lock has been achieved is then determined by comparing the BER to a predetermined threshold (step 160). If lock has been achieved, the main tracking loop is entered. If it is determined that lock has not been achieved than the system goes back to the acquisition (step 161).

Figure 18:
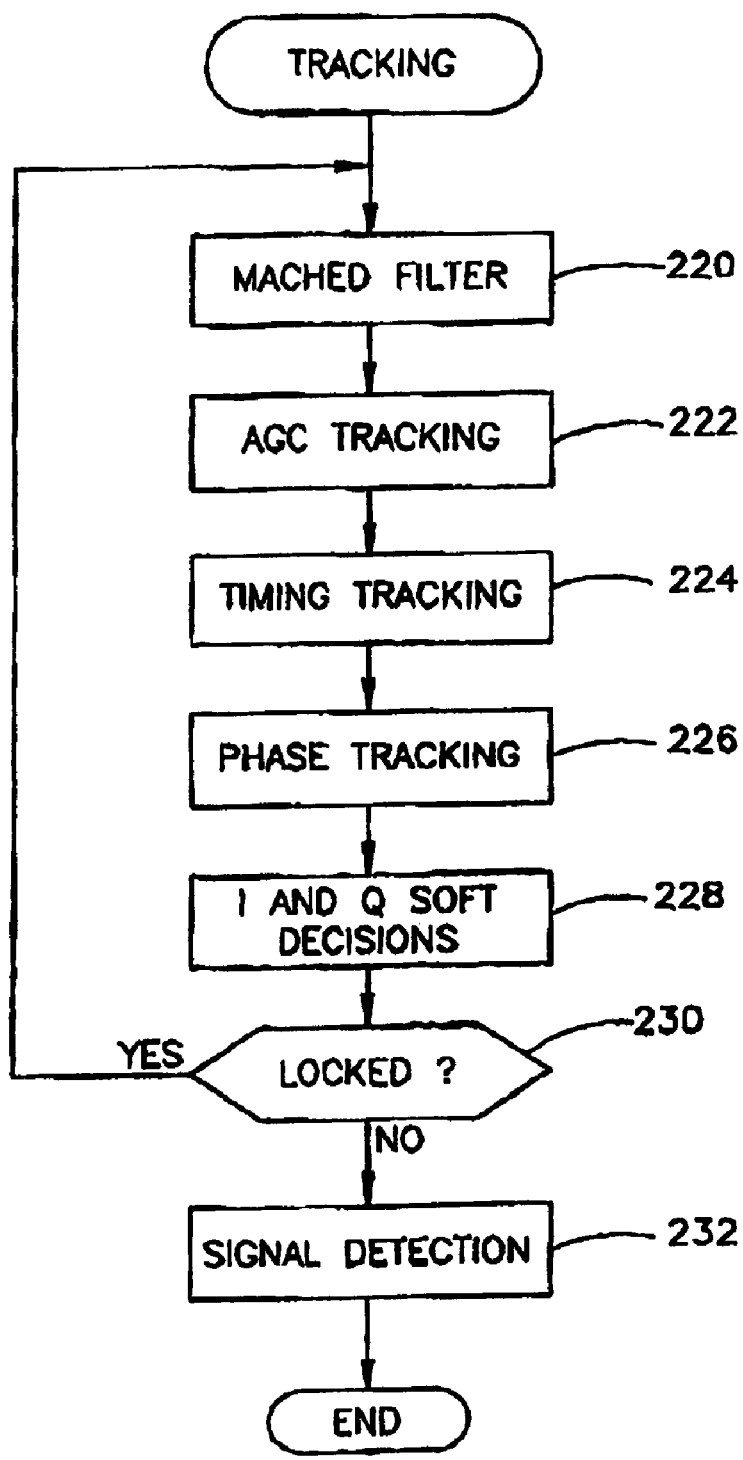
FIG. 18 is a flow diagram illustrating the tracking processing portion of the variable rate modem.

A flow diagram illustrating the tracking processing portion of the variable rate modem is shown in FIG. 18. The various functions performed in tracking are substantially the same as those performed during the pre-tracking stage except for the phase tracking which has a smaller loop bandwidth.

The tracking stage comprises the steps of performing a matched filter (step 220), AGC tracking (step 222), timing tracking (step 224), phase tracking (step 226), I and Q soft decisions (step 228) and determining whether lock has been achieved (step 230). If it is determined that lock is achieved, the signal detection is declared (step 232).

In operation, the main loop advances from stage to stage until tracking is achieved. At that point, the BER is measured by the Viterbi decoder. If the BER indicates failure, then the system returns back to acquisition.

If the BER indicates lock, then the system remains in tracking until the BER indicates that the system is not in lock due to a large number of errors. Other indications may be used such as the behavior of phase locking loops.

While the invention has been described with respect to a limited number of embodiments, it will be appreciated that many variations, modifications and other applications of the invention may be made.

What is claimed is:

1. A receiver baseband apparatus, comprising:

an input unit adapted to receive an I and Q signal;

a first matched filter adapted to receive said I signal and generate an I filtered output therefrom;

a second matched filter adapted to receive said Q signal and generate a Q filtered output therefrom;

a processor programmed to perform the steps of;

detecting the presence of signal activity as input to said receiver baseband apparatus;

acquiring said signal activity by performing coarse phase acquisition on said signal activity once it is detected, wherein said performing coarse phase acquisition comprises:

rotating vectors $z_n$ representing said signal activity into a single quadrant by an angle $\Theta k$;

wiping off said $z_n(\Theta k)$ modulation;

summing the wiped off vectors $z_n(\Theta k)$;

determining the energy contained within a plurality of hypotheses; and selecting a single hypothesis from said plurality of hypotheses having the maximum energy;

pre-tracking said signal activity once it is detected; and tracking said signal activity once it is detected;

a decoder adapted to receive said I filtered output signal and said Q filtered output signal from said processor and to generate a decoded output therefrom;

a deinterleaver adapted to generate a deinterleaved output in accordance with said decoded output signal input thereto;

a forward error correction decoder adapted to generate output receive data in accordance with said deinterleaved output signal input thereto; and a controller adapted to manage and control said input unit, first matched filter, second matched filter, said processor, said decoder, said deinterleaver and said forward error correction decoder.

2. A receiver baseband apparatus, comprising:

an input unit adapted to receive an I and Q signal;

an I matched filter adapted to receive said I signal and generate an I filtered output therefrom;

a Q matched filter adapted to receive said Q signal and generate a Q filtered output therefrom;

a processor programmed to;

perform automatic gain control (AGC) and generate an AG control signal therefrom;

perform timing detection and generate an analog to digital (A/D) clock control signal therefrom;

perform phase detection and generate a voltage controlled oscillator (VCO) control signal therefrom;

a decoder adapted to receive said I filtered output signal and said Q filtered output signal from said processor and to generate a decoded output therefrom;

a deinterleaver adapted to generate a deinterleaved output in accordance with said decoded output signal input thereto;

a forward error correction decoder adapted to generate output receive data in accordance with said deinterleaved output signal input thereto; and a controller adapted to manage and control said input unit, I matched filter, Q matched filter, said processor, said decoder, said deinterleaver and said forward error correction decoder;

wherein said processor is further operable to acquire signal activity by performing coarse phase acquisition on said signal activity, wherein said performing coarse phase acquisition comprises:

rotating vectors $z_n$ representing said signal activity into a single quadrant by an angle $\Theta k$;

wiping off said $z_n(\Theta k)$ modulation;

summing the wiped off vectors $z_n(\Theta k)$:

determining the energy contained within a plurality of hypotheses; and selecting a single hypothesis from said plurality of hypotheses having the maximum energy.

3. The apparatus according to claim 2, wherein said processor is further operable to pre-track said signal activity by performing timing acquisition on K groups, each made up of N DFT estimates, each estimate calculated from blocks of 16 symbols, said performing timing acquisition comprising:

calculating estimate $t_i$ based on a DFT for 16 contiguous symbols, i=1 . . . N, thereby obtaining N DFT estimates each based on a block of symbols;

generating a histogram of said N DFT estimates $t_i$;

classifying range said group the N estimates are in based on said histogram;

unwrapping said N DFT estimates and calculating their average $T_i$; and unwrapping K average estimates $T_i$ and performing a least square fit of said K averages to generate a final estimate.

* * * * *